(12) United States Patent
Ando et al.

(10) Patent No.: US 7,418,194 B2
(45) Date of Patent: Aug. 26, 2008

(54) DATA STRUCTURE OF STREAM DATA, AND RECORDING AND PLAYBACK METHOD THEREOF

(75) Inventors: Hideo Ando, Hino (JP); Hideki Mimura, Yokohama (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 1458 days.

(21) Appl. No.: 10/243,694

(22) Filed: Sep. 16, 2002

(65) Prior Publication Data

US 2003/0031467 A1 Feb. 13, 2003

Related U.S. Application Data

(60) Division of application No. 09/755,144, filed on Jan. 8, 2001, now Pat. No. 6,456,783, which is a continuation of application No. PCT/JP00/02935, filed on May 8, 2000.

(30) Foreign Application Priority Data

May 7, 1999 (JP) .................................. 11-127375

(51) Int. Cl.
H04N 7/26 (2006.01)
H04N 5/00 (2006.01)

(52) U.S. Cl. ....................... 386/125; 386/124

(58) Field of Classification Search ................ 386/125, 386/124, 109, 111, 112, 45, 105, 106
See application file for complete search history.

(56) References Cited

U.S. PATENT DOCUMENTS 5,784,528 A 7/1998 Yamane et al.
5,805,537 A 9/1998 Yamatoto et al.
6,181,871 B1 1/2001 Saeki et al.
6,185,365 B1 2/2001 Murase et al.
6,973,258 B1 * 12/2005 Yoo et al. .................... 386/111

FOREIGN PATENT DOCUMENTS

| | | |
|---|---|---|
| EP | 881-838 | 12/1998 |
| JP | 56-48771 | 2/1981 |
| JP | 8-339630 | 12/1996 |
| JP | 9-9205 | 1/1997 |
| JP | 9-115251 | 5/1997 |
| JP | 9-251762 | 9/1997 |
| JP | 10-92159 | 4/1998 |
| JP | 10-134509 | 5/1998 |
| JP | 10-155138 | 6/1998 |
| JP | 10-334615 | 12/1998 |
| JP | 11-45512 | 2/1999 |
| JP | 11-98460 | 4/1999 |
| JP | 11-298845 | 10/1999 |
| JP | 2000-195170 | 7/2000 |

* cited by examiner

*Primary Examiner*—Robert Chevalier
(74) *Attorney, Agent, or Firm*—Oblon, Spivak, McClelland, Maier & Neustadt, P.C.

(57) ABSTRACT

Stream object SOB is made up of one or more stream packs S_PCK, each of which is made up of a pack header and stream packet S_PKT. The pack header includes predetermined time information SCR, and the stream packet includes one or more application packets AP_PKT appended with predetermined time stamps ATS. The application packet which is input to a streamer upon recording such stream object is time-stamped by a local reference clock corresponding to the predetermined time information.

6 Claims, 21 Drawing Sheets

| | |
|---|---|
| LONG APPLICATION HEADER 11 | VERSION NUMBER OF APPLICATION HEADER 321 |
| | DATA LENGTH (NUMBER OF BYTES) OF MODIFIED TIME STAMP 322 |
| | DATA LENGTH (NUMBER OF BYTES) OF APPLICATION PACKET 323 |
| | NUMBER OF APPLICATION PACKETS PRESENT IN STREAM PACK 324<br>(COUNTED FROM APPLICATION PACKET INDICATED BY FIRST MODIFIED TIME STAMP SET IN STREAM PACK) |
| | HEAD POSITION INFORMATION (NUMBER OF BYTES) OF FIRST MODIFIED TIME STAMP SET IN STREAM PACK 325 |
| | IDENTIFICATION FLAG OF LONG APPLICATION HEADER 326 |
| | FLAG INDICATIONG PRESENCE OF START APPLICATION PACKET OF STREAM OBJECT #A·298 IN STREAM PACK 327 |
| | FLAG INDICATIONG PRESENCE OF END APPLICATION PACKET OF STREAM OBJECT #A·298 IN STREAM PACK 328 |
| | REFERENCE CLOCK FREQUENCY OF MODIFIED TIME STAMP 329 |
| | SERVICE ID INFORMATION 330 |
| | MAXIMUM BIT RATE INFORMATION 331 |
| | SMOOTH BUFFER SIZE 332 |

FIG. 7

| APPLICATION HEADER (SHORT APPLICATION HEADER) 13 | VERSION NUMBER OF APPLICATION HEADER 321 |
| --- | --- |
| | DATA LENGTH (NUMBER OF BYTES) OF MODIFIED TIME STAMP 322 |
| | DATA LENGTH (NUMBER OF BYTES) OF APPLICATION PACKET 323 |
| | NUMBER OF APPLICATION PACKETS PRESENT IN STREAM PACK 324 (COUNTED FROM APPLICATION PACKET INDICATED BY FIRST MODIFIED TIME STAMP SET IN STREAM PACK) |
| | HEAD POSITION INFORMATION (NUMBER OF BYTES) OF FIRST MODIFIED TIME STAMP SET IN STREAM PACK 325 |
| | IDENTIFICATION FLAG OF LONG APPLICATION HEADER 326 |
| | FLAG INDICATIONG PRESENCE OF START APPLICATION PACKET OF STREAM OBJECT #B · 299 IN STREAM PACK 327* |
| | FLAG INDICATIONG PRESENCE OF END APPLICATION PACKET OF STREAM OBJECT #B · 299 IN STREAM PACK 328* |
| | REFERENCE CLOCK FREQUENCY OF MODIFIED TIME STAMP 329 |
| | SERVICE ID INFORMATION 330 |

FIG. 8

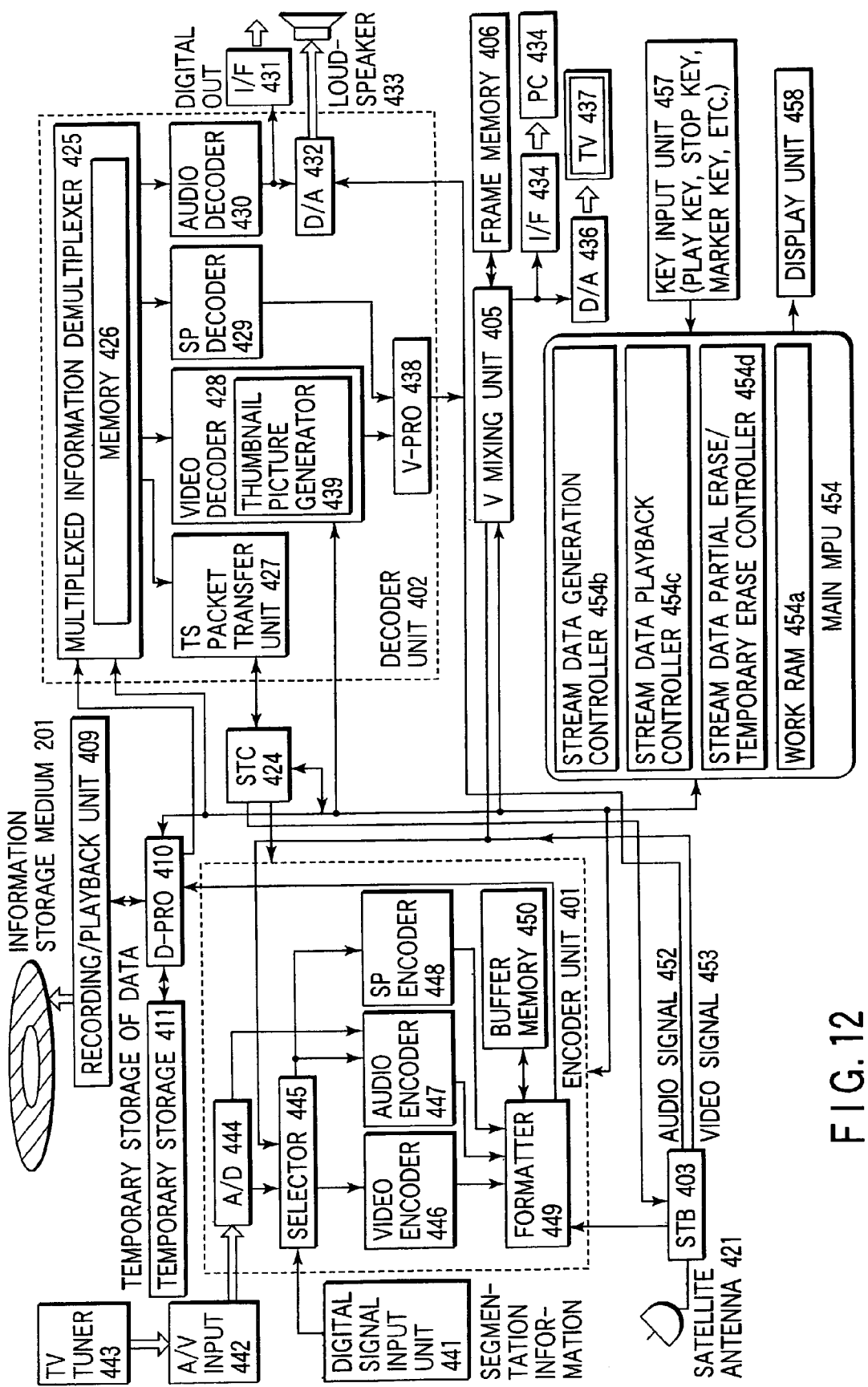
F I G. 12

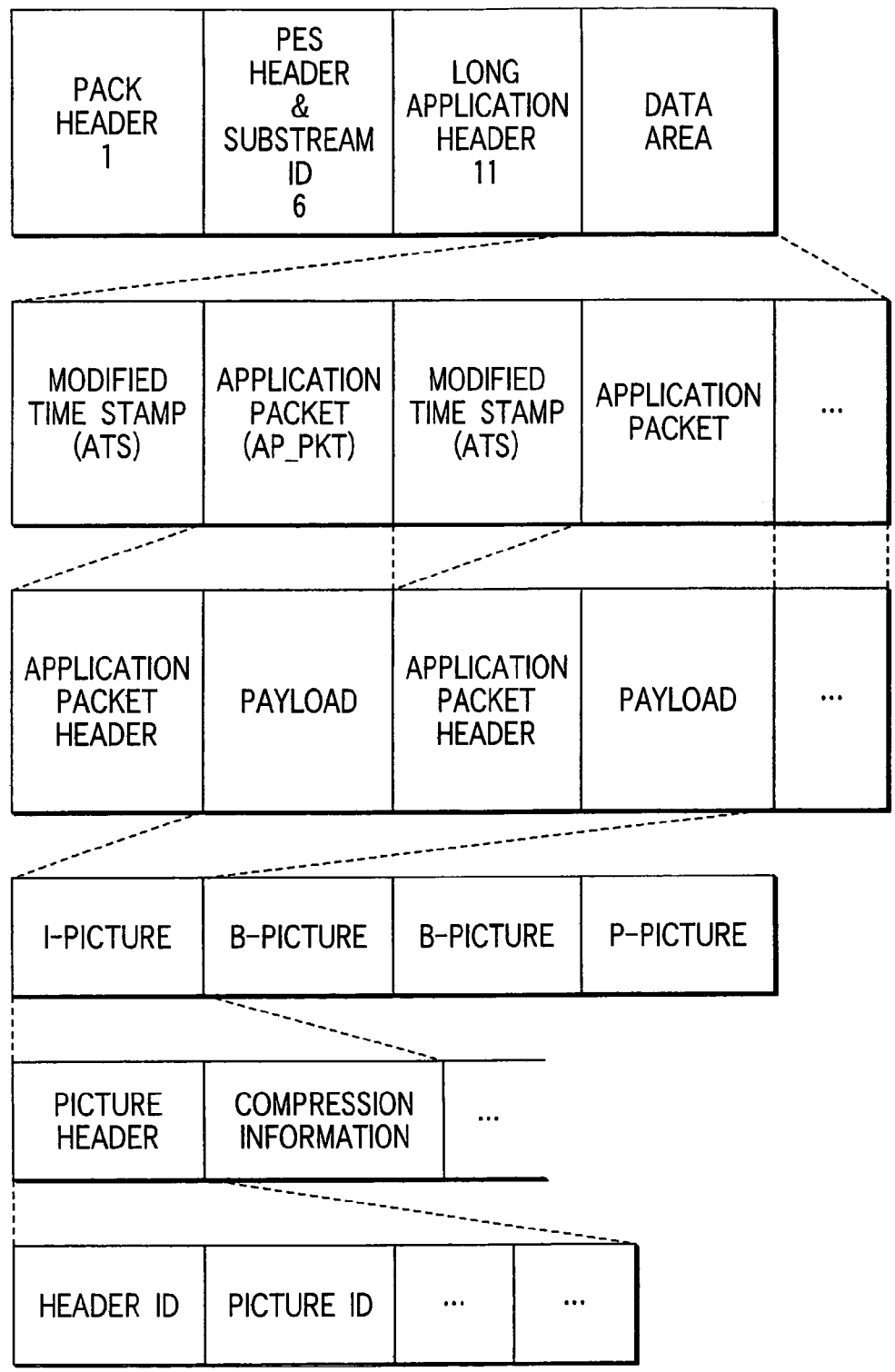
F I G. 14

DATA STRUCTURE OF STREAM DATA, AND RECORDING AND PLAYBACK METHOD THEREOF

CROSS-REFERENCE TO RELATED APPLICATIONS

This Application is a Divisional of co-pending U.S. patent application Ser. No. 09/755,144 filed Jan. 8, 2001, which is a Continuation Application of PCT Application No. PCT/JP00/02935, filed May 8, 2000, which was not published under PCT Article 21(2) in English.

This application is based upon and claims the benefit of priority from the prior Japanese Patent Application No. 11-127375, filed May 7, 1999, the entire contents of which are incorporated herein by reference.

BACKGROUND OF THE INVENTION

The present invention relates to a data structure suitable for recording/playing back video data sent in digital broadcast or the like or stream data sent with a packet structure, a method of recording stream data using this data structure, and a method of playing back stream data recorded with this data structure.

(Description of Prior Art)

In recent years, TV broadcast has come into the era of digital broadcast. Accordingly, an apparatus for saving digital data of digital TV broadcast as they are irrespective of their contents, i.e., a so-called streamer, has been demanded.

The current digital TV broadcast uses an MPEG transport stream. In the future, an MPEG transport stream is projected to be used as a standard one in the field of digital broadcast using moving picture.

In such digital broadcast, the contents (mainly, video information) to be broadcasted are time-divided into groups of data each having a predetermined size (e.g., 188 bytes) called transport packets, and broadcast data is sent in units of transport packets.

As a streamer for recording digital broadcast data, a home digital VCR such as D-VHS (digital VHS) or the like is currently commercially available. A streamer using D-VHS directly records a broadcasted bitstream on a tape. For this reason, a plurality of programs are multiplexed and recorded on a video tape.

Upon playback, all data are output from the VCR to a set-top box (digital TV reception apparatus; to be abbreviated as an STB hereinafter) when they are played back either from the beginning or the middle of the tape. In this STB, a desired program is selected from the output data by user operation or the like. The selected program information is transferred from the STB to a digital TV receiver, and is played back (playback of video+audio and the like).

Since this D-VHS streamer uses a tape as a recording medium, it cannot attain quick random access, and it is difficult to quickly jump to a desired position of a required program so as to play it back.

As a promising candidate that can combat such shortcoming (difficulty of random access) of the tape, a streamer that uses a large-size disc medium such as a DVD-RAM or the like has been proposed. In this case, management data must be inevitably recorded together with broadcast data in consideration of random access, special playback, and the like.

(Problem)

Digital TV broadcast adopts an MPEG transport stream as a transmission method of stream data containing video information, and video information is sent while being combined in units of application packets each having, e.g., 188 bytes. By contrast, when a recording medium such as a DVD-RAM disc or the like that belongs to a DVD family is used, recording must be done in units of sectors, the minimum recording unit of which is 2,048 bytes. However, the following problems remain unsolved.

(1) A method of efficiently recording information of 188-byte application packets in units of 2,048-byte sectors is not settled yet.

(2) A method of playing back stream data recorded on an information storage medium while holding the reception timing of digital TV broadcast is not settled yet.

Furthermore, there is also a need for recording digital data which is transferred with a packet structure in a local area network (LAN) or a digital telephone line such as ISDN or the like using a streamer.

However, the following problem also remains unsolved.

(3) No versatile recording method that can record digital data other than digital TV is available.

(Object)

It is an object of the present invention to provide a data structure (recording format) on an information storage medium, which can efficiently record stream data on an information storage medium, and can play back stream data from an information storage medium while holding transfer timings between application packets received in digital TV broadcast.

It is another object of the present invention to provide a method of recording stream data using the data structure.

It is still another object of the present invention to provide a method of playing back stream data recorded with the data structure.

BRIEF SUMMARY OF THE INVENTION

In order to achieve the above object, in a data structure according to the present invention, a set of one or more stream objects (SOB) that represent playback data for a recorded bitstream constitutes stream data, the stream object (SOB) is formed of one or more stream packs (S_PCK), and the stream pack (S_PCK) is formed of a pack header and stream packet (S_PKT). The pack header includes predetermined time information (SCR), and the stream packet (S_PKT) includes one or more application packets (AP_PKT) assigned with predetermined time stamps (ATS). The application packet (AP_PKT) is incoming (to a streamer) during recording of the stream object (SOB) is time-stamped (modified time stamp in FIG. 14; ATS in FIG. 15) by a local reference clock (440 in FIG. 9) (in the streamer) corresponding to the predetermined time information (SCR).

In order to achieve the other object, in a recording method according to the present invention, a set of one or more stream objects (SOB) that represent playback data for a recorded bitstream constitutes stream data, the stream object (SOB) is formed of one or more stream packs (S_PCK), and the stream pack (S_PCK) is formed of a pack header and stream packet (S_PKT). The pack header includes predetermined time information (SCR), and the stream packet (S_PKT) includes one or more application packets (AP_PKT) assigned with predetermined time stamps (ATS). The application packet (AP_PKT) is incoming (to a streamer) upon recording the stream object (SOB) on an information medium (201) is time-stamped (modified time stamp in S4 in FIG. 10; time stamp in ST106, ST212, and ST312 in FIGS. 21 to 23) by a local reference clock (440 in FIG. 9) (in the streamer) corresponding to the predetermined time information (SCR).

In order to achieve the still other object, a playback method according to the present invention uses an information medium (201) on which stream objects (SOB) are recorded in a format in which a set of one or more stream objects (SOB) that represent playback data for a recorded bitstream constitutes stream data, the stream object (SOB) is formed of one or more stream packs (S_PCK), the stream pack (S_PCK) is formed of a pack header and stream packet (S_PKT), the pack header includes predetermined time information (SCR), the stream packet (S_PKT) includes one or more application packets (AP_PKT) assigned with predetermined time stamps (ATS), the incoming application packet (AP_PKT) (to a streamer) is time-stamped by a local reference clock (440 in FIG. 9) (in the streamer) corresponding to the predetermined time information (SCR). When recorded information is played back from this medium, a playback reference clock is set (S37 in FIG. 11) on the basis of the local reference clock (SCR 303 in FIG. 5, SCR base in FIG. 15) played back from the information medium (201), and contents of the bitstream are played back from the information medium (201) on the basis of the set playback reference clock (SCR).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a view showing an example of the internal structure of a long application header shown in FIG. 1;

FIG. 8 is a view showing an example of the internal structure of an application header (short application header) shown in FIG. 1;

FIG. 12 is a block diagram for explaining the arrangement of a recording/playback system (a system that integrates an optical disc device and STB device) according to an embodiment of the present invention;

FIG. 14 is a view for explaining, especially, the data in a data area in the data structure according to an embodiment of the present invention;

DETAILED DESCRIPTION OF THE INVENTION

A recording method of stream data, its data structure, and the like according to an embodiment of the present invention will be described hereinafter with reference to the accompanying drawings.

Figure 1:
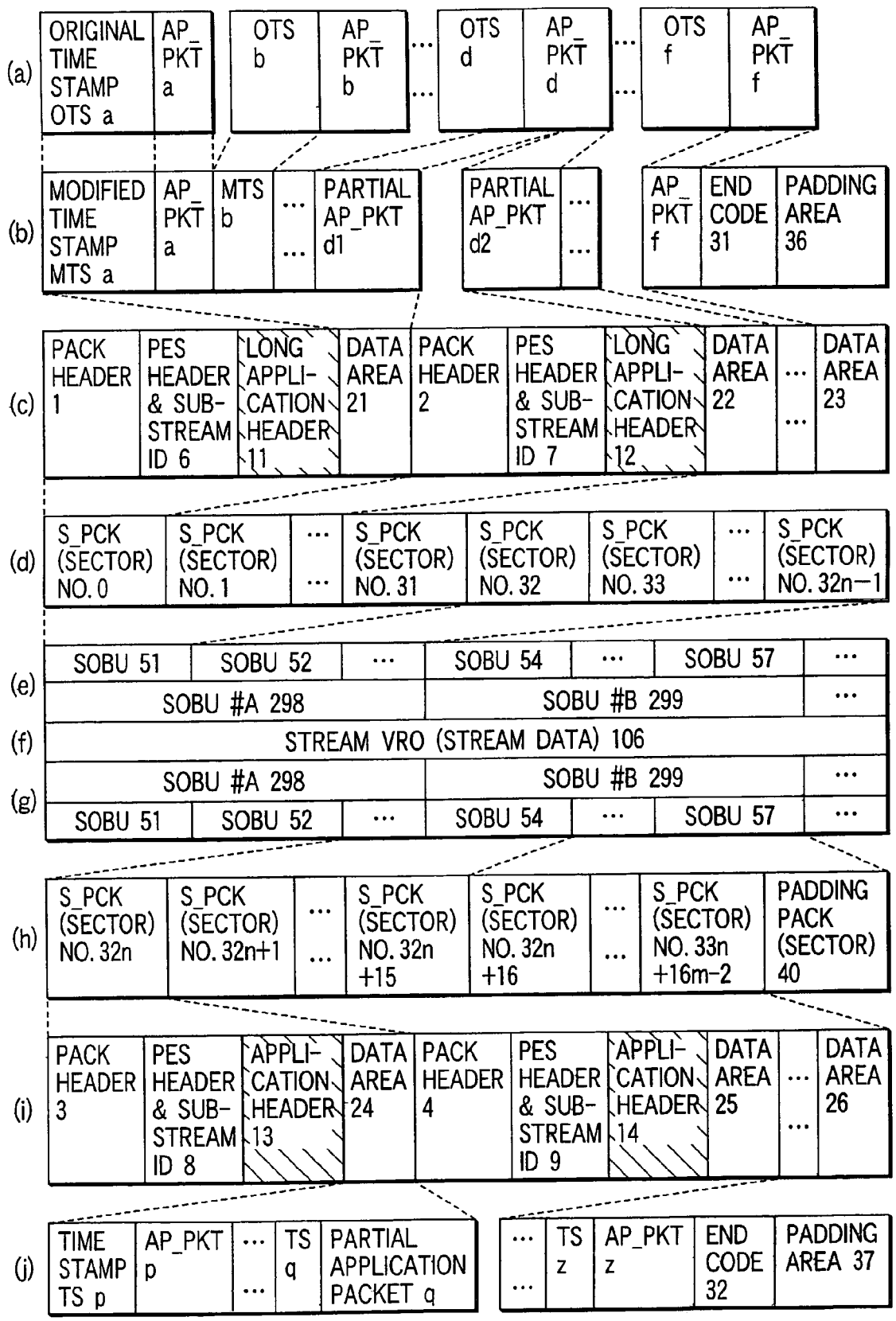
FIG. 1 is a view for explaining the data structure of stream data according to an embodiment of the present invention.

FIG. 1 is a view for explaining the data structure of stream data according to an embodiment of the present invention. FIG. 1 shows the data structure (hierarchical structure) of stream data recorded on an information storage medium (e.g., an optical disc using phase change recording, magnetooptical recording, or the like), and its forming process.

Stream data (STREAM.VRO 106 in FIG. 1(f)) is recorded on an information storage medium to be combined as stream objects (to be abbreviated as SOBs hereinafter) in units of contents of video information the stream data. FIG. 1 shows two of stream objects in detail, which are represented by stream object #A (SOB#A) 298 and stream object #B (SOB#B) 299. FIG. 1 shows data forming STREAM.VRO 106 (SOB#A•298, SOB#B•299, . . . ), and the data structure being formed.

SOB#A•298 is comprised of stream object units (to be abbreviated as SOBUs hereinafter) 51, 52, . . . , as shown in FIGS. 1(e) and 1(g). Likewise, SOB#B•299 is comprised of SOBU 54, . . . , SOBU 57, . . . .

As shown in FIGS. 1(d) and 1(h), each SOBU is made up of a plurality of stream packs. FIG. 1 illustrates an example which SOBU 51 of SOB#A•298 is made up of stream packs No. 0, No. 1, . . . , No. 31, and SOBU 52 of SOB#A•298 is made up of stream packs No. 32, No. 33, . . . , No. 32n−1.

Stream pack No. 0 includes pack header 1, PES & substream ID 6, long application header 11, and data area 21, as shown in FIG. 1(c). The same applies to other stream packs. Note that long application header 11 is appended when recording is done on a recording medium. Upon recording, data area 21 includes one or more pairs of modified time stamps (or application time stamps) and application packets, as shown in FIG. 1(b).

The modified time stamp shown in FIG. 1(b) is obtained by re-appending an original time stamp (FIG. 1(a)) sent in digital broadcast. The original time stamp is appended when data is sent according to the IEEE1394 standards. The application packet shown in FIG. 1(b) is a packet itself sent in digital broadcast.

Stream object #B (SOB#B) 299 will be explained below. SOBU 54 of SOB#B•299 is made up of stream packs No. 32n, No. 32n+1, . . . , No. 32n+15, and SOBU 57 of SOB#B•299 is made up of stream packs No. 32n+16, No. 32n+16m−2, and padding pack 40, as shown in FIGS. 1(g) and 1(h).

Stream pack No. 32n consists of pack header 3, PES header & substream ID 8, application header (short application header) 13, and data area 24, as shown in FIG. 1(i). The same applies to other stream packs. Data area 24 contains one or more pairs of time stamps and application packets, a shown in FIG. 1(j).

When stream data is recorded on a recording medium such as a DVD-RAM disc or the like, recording is done using 2,048-byte sectors as minimum units. In the recording format (data structure) of stream data, stream packs are formed in units of sectors, as shown in FIGS. 1(d) and 1(h). Each stream pack is made up of a pack header, PES header & substream ID, long or short application header, and data area, as shown in FIG. 1(c) or 1(i).

That is, pack headers 1, 2, 3, and 4 and subsequent PES headers & substream IDS 6, 7, 8, and 9 are set at the head positions of the respective stream packs. Between data areas 21 to 26 where actual stream data are recorded, and PES headers & substream IDs 6 to 9, application headers are set. In an embodiment of the present invention, long application headers 11 and 12 and short application headers 13 and 14 are selectively used as the application headers in correspondence with the information contents of stream data to be recorded.

In an embodiment of the present invention, in a single stream object (SOB#A•298 or SOB#B•299, application headers in all stream packs are of the same type (long or short application header). That is, all stream packs in SOB#A_298 use long application headers 11 and 12, as shown in FIG. 1(c), and all stream packs in SOB#B•299 use short application headers 13 and 14, as shown in FIG. 1(i).

Details of long and short application headers 11 and 13 will be explained later with reference to FIGS. 7 and 8.

Referring back to FIG. 1, a description will be resumed. As shown in FIG. 1(b), when application packet d obtained upon receiving digital TV broadcast is recorded on an information storage medium, it may be divisionally recorded in two stream packs. This is to efficiently use the recording area of the information storage medium. Such divisionally recorded application packets are indicated by partial application packets. In this case, partial application packet d2 is set and recorded at the start position of data area 22 of stream pack No. 1.

When playback starts from information of stream pack No. 1 (FIG. 1(d)) upon playing back stream data, it must start from the modified time stamp position (not shown) immediately after partial application packet d2. Thence, the head position information of the modified time stamp set at the head in the stream pack is recorded as the number of bytes in field 325 (see FIGS. 7 and 8) in long application header 11 or short application header 13, so that playback means of a playback apparatus can directly access this modified time stamp.

Based on this information (head position information of the modified time stamp set at the head in the stream pack) and information of the data length (field 322 in FIGS. 7 and 8) of the modified time stamp, and information of the data length (field 323 in FIGS. 7 and 8) of the application packet, the application packet position of a predetermined number recorded in data area 21 in FIG. 1(c) can be obtained.

As shown in FIGS. 1(e) and 1(g), a plurality of stream packs are combined to form stream object units SOBU 51 to 57. In an embodiment shown in FIG. 1, one SOBU 51 or 52 in SOB#A•298 consists of 32 stream packs (sectors), and one SOBU 54 or 57 in SOB#B•299 consists of 16 stream packs (sectors).

Behind application packets f and z (FIGS. 1(a) and 1(j)) recorded at the end in last stream packs, end codes 31 and 32 are recorded, as shown in FIGS. 1(b) and 1(j). Behind these end codes, padding areas 36 and 37 padded with data of all "1"s or "0"s are assured as needed.

When the last stream pack recorded with last stream information is located at the central portion of SOBU 57, the subsequent sectors in that SOBU 57 form padding pack 40 shown in FIG. 1(h).

In order to indicate the recorded range of stream data in SOB#B•299, flags indicating the presence of start/end application packets of SOB#B•299 in the stream packs are set in fields 327* and 328* (see FIG. 8) in short application header 13.

A search can be made using modified time stamp information as search information for application packets recorded on an information storage medium. Especially, when a search is made using an elapsed video recording time, the value of a reference clock frequency of the modified time stamp described in field 329 (see FIGS. 7 and 8) in an application header is important. For this reason, this reference clock frequency information is recorded in long and short application headers 11 and 13.

Figure 2:
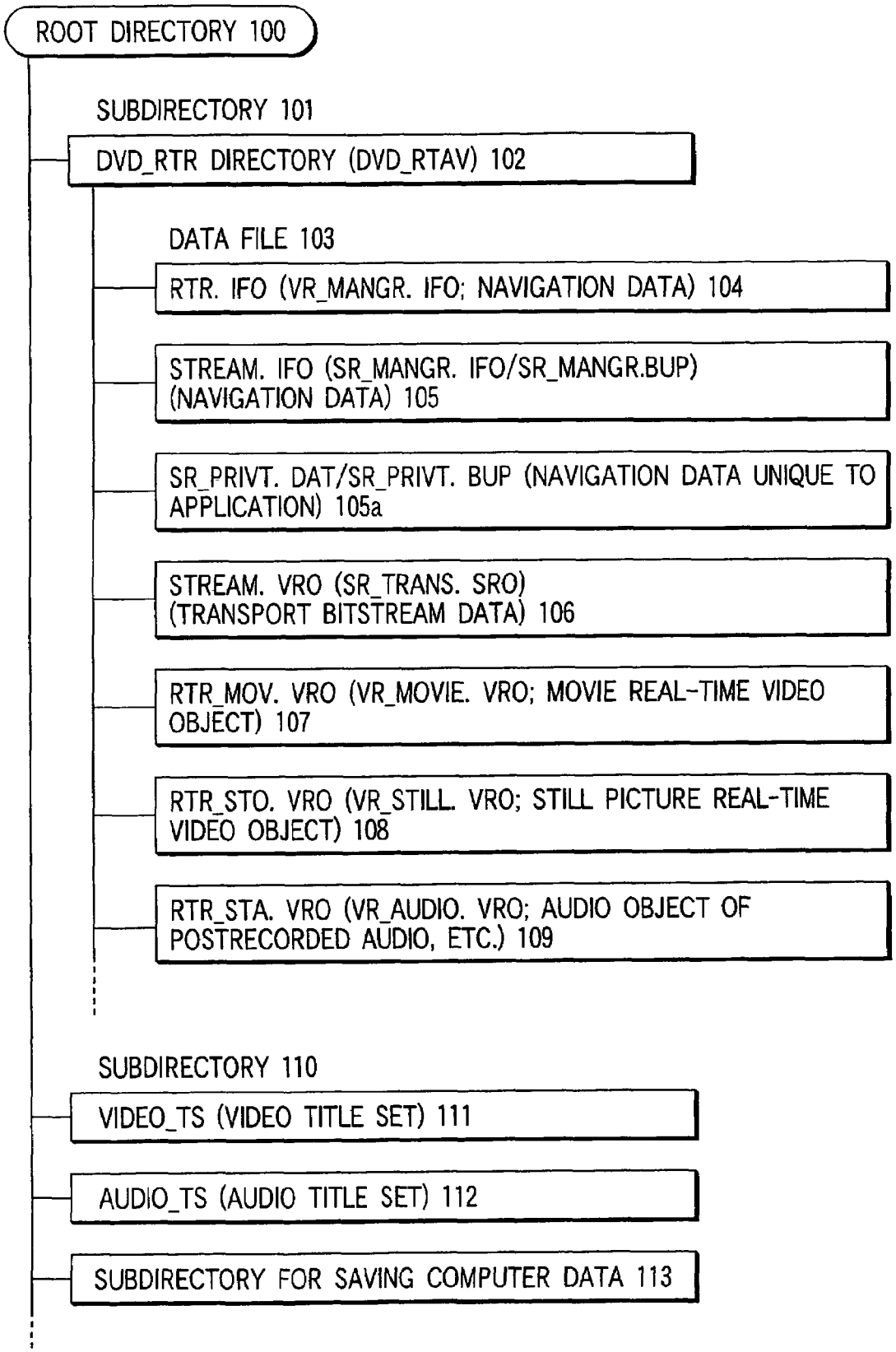
FIG. 2 is a view for explaining the directory structure of data files according to an embodiment of the present invention.

FIG. 2 is a view for explaining the directory structure of data files according to an embodiment of the present invention. The contents (file structure) of information recorded on the information storage medium according to an embodiment of the present invention will be explained below, with reference to FIG. 2.

Each information recorded on an information storage medium such as a DVD-RAM disc or the like has a hierarchical file structure. Video information and stream data information to be explained in this embodiment are stored in subdirectory 101 named DVD_RTR directory (or DVD_RTAV) 102.

DVD_RTR (DVD_RTAV) directory 102 stores data file 103 having the following contents. More specifically, as a group of management information (navigation data), RTR.IFO (or VR_MANGR.IFO) 104, STREAM.IFO (SR_MANGR.IFO/SR_MANGR.BUP) 105, and SR_PRIVT.DAT/SR_PRIVT.BUP 105a are stored.

As a data main body (contents information), STREAM.VRO (SR_TRANS.SRO) 106, RTR_MOV.VRO (VR_MOVIE.VRO) 107, RTR_STO.VRO (or VR_STILL.VRO) 108, and RTR_STA.VRO (or VR_AUDIO.VRO) 109 are stored.

Root directory 100 as an upper layer of subdirectory 101 including data file 103 can be provided with subdirectory 110 for storing other kinds of information. This subdirectory includes, as its contents, video title set VIDEO_TS 111 that stores video programs, audio title set AUDIO_TS 112 that stores audio programs, subdirectory 113 for saving computer data and the like.

Data which is transmitted on a wired or wireless data communication path in the form of a packet structure and is recorded on an information storage medium while holding the packet structure is called "stream data". The stream data themselves are recorded together with file name STREAM.VRO (or SR_TRANS.SRO) 106. A file that records management information of the stream data is STREAM.IFO (or SR_MANGR.IFO and its backup file SR_MANGR.BUP) 105.

A file that records analog video information which is used in a VCR (VTR) or conventional TV and is digitally compressed based on MPEG2 is RTR_MOV.VRO (or VR_MOVIE.VRO) 107, a file that collects still picture information including postrecorded audio, background audio, or the like is RTR_STO.VRO (or VR_STILL.VRO) 108, and its postrecorded audio information file is RTR_STA.VRO (or VR_AUDIO.VRO) 109.

Figure 3:
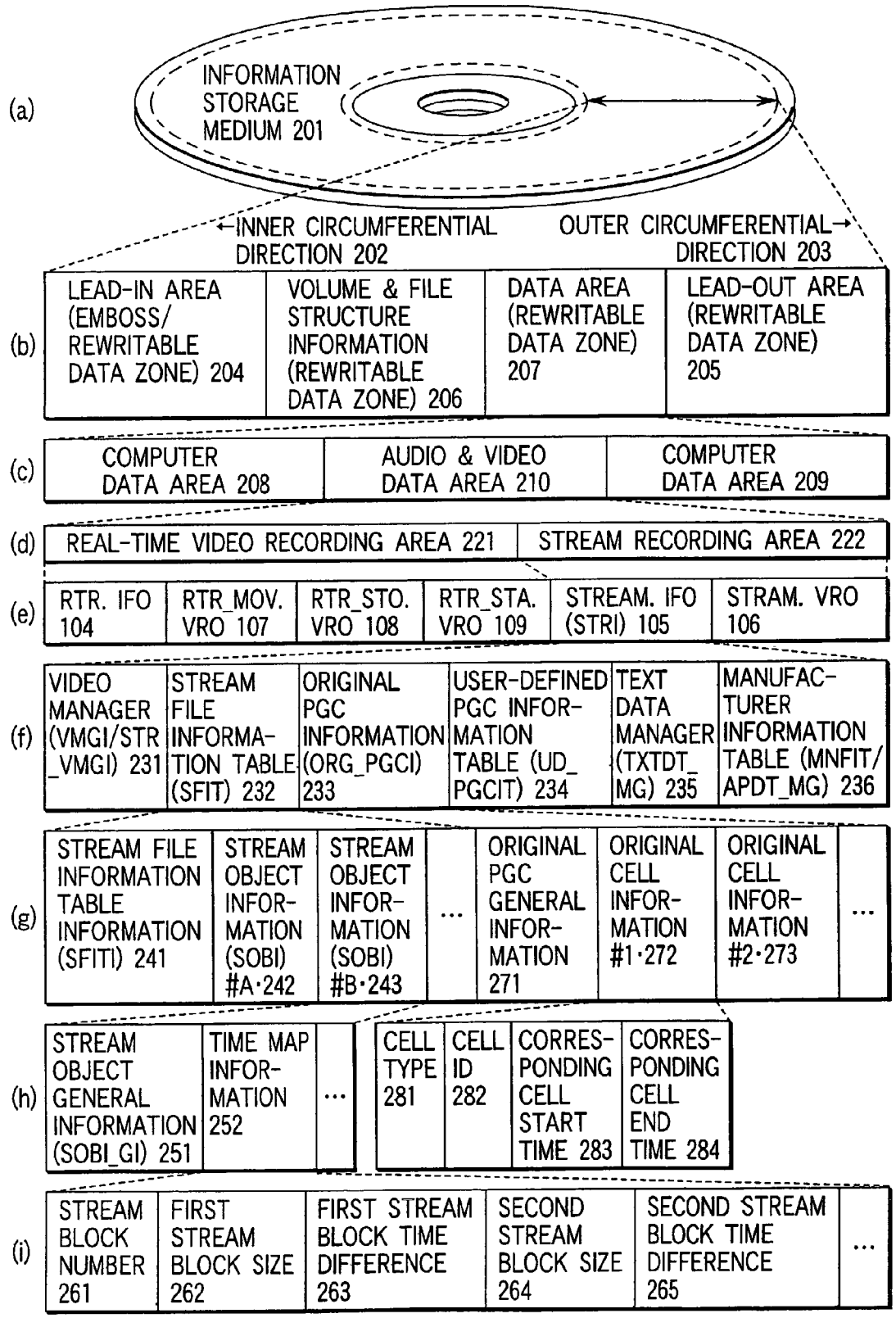
FIG. 3 is a view for explaining the recorded data structure (especially, the structure of management information) on an information medium (recordable/reproducible DVD disc) according to an embodiment of the present invention.

FIG. 3 is a view for explaining the recorded data structure (especially, the structure of management information) on an information medium (recordable/reproducible DVD disc) according to an embodiment of the present invention. In an area sandwiched between the ends of inner circumferential direction 202 and outer circumferential direction 203 of information storage medium 201 shown in FIG. 3(*a*), lead-in area 204, volume & file structure information 206 that records file system information, data area 207, and lead-out area 205 are present, as shown in FIG. 3(*b*). Lead-in area 204 is made up of an emboss zone and rewritable data zone, and lead-out area 205 is made up of a rewritable data zone. Data area 207 is also made up of a rewritable data zone.

Data area 207 can record computer data and audio & video data together, as shown in FIG. 3(*c*). In this example, audio & video data area 210 is sandwiched between computer data areas 208 and 209.

Audio & video data area 210 can record real-time video recording area 221 and stream recording area 222 together, as shown in FIG. 3(*d*). (Either of real-time video recording area 221 or stream recording area 222 can be used.) As shown in FIG. 3(*e*), real-time video recording area 221 records RTR navigation data RTR.IFO (VR_MANGR.IFO) 104, movie real-time video object RTR_MOV.VRO (VR_MOVIE.VRO) 107, still picture real-time video object RTR_STO.VRO (VR_STILL.VRO) 108, and audio object RTR_STA.VRO (VR_AUDIO.VRO) 109 such as postrecorded audio or the like, which are shown in FIG. 2.

Also, as shown in FIG. 3(*e*), stream recording area 222 records streamer navigation data STREAM.IFO (SR_MANGR.IFO/SR_MANGR.BUP) 105 and transport bitstream data STREAM.VRO (SR_TRANS.SRO) 106, which are shown in FIG. 2.

Note that stream recording area 222 can also record navigation data SR_PRIVT.DAT/SR_PRIVT.BUP 105*a* unique to an application shown in FIG. 2, although not shown in FIGS. 3(*d*) and 3(*e*). This SR_PRIVT.DAT 105*a* is navigation data unique to an individual application connected (supplied) to the streamer, and need not be recognized by the streamer.

STREAM.IFO (or SR_MANGR.IFO) 105 as management information that pertains to stream data has a data structure shown in FIGS. 3(*f*) to 3(*i*). More specifically, as shown in FIG. 3(*f*), STREAM.IFO (or SR_MANGR.IFO) 105 is comprised of video manager (VMGI or STR_VMGI) 231, stream file information table (SFIT) 232, original PGC information (ORG_PGCI) 233, user-defined PGC information table (UD_ PGCIT) 234, text data manager (TXTDT_MG) 235, and manufacturer information table (MNFIT) or application private data manager (APDT_MG) 236 that manages navigation data SR_PRIVT.DAT 105*a* unique to an application.

Stream file information table (SFIT) 232 shown in FIG. 3(*f*) can contain stream file information table information (SFITI) 241, one or more pieces of stream object information (SOBI) #A•242, #B•243, . . . , original PGC information general information 271, and one or more pieces of original cell information #1•272, #2•273, . . . , as shown in FIG. 3(*g*).

Each stream object information (e.g., SOBI#A•242) shown in FIG. 3(*g*) can contain stream object general information (SOBI_GI) 251, time map information 252, and the like, as shown in FIG. 3(*h*).

Each original cell information (e.g., #1-272; corresponding to SCI shown in FIG. 17 to be described later) shown in FIG. 3(*g*) can contain cell type 281 (corresponding to C_TY shown in FIG. 17 to be described later), cell ID 282, corresponding cell start time (corresponding to SC_S_APAT shown in FIG. 17 to be described later) 283, and corresponding cell end time (corresponding to SC_E_APAT shown in FIG. 17 to be described later) 284, as shown in FIG. 3(*h*).

Time map information 252 in FIG. 3(*h*), which is contained in SOBI#A in FIG. 3(*g*) can include stream block number 261, first stream block size 262, first stream block time difference 263, second stream block size 264, second stream block time difference 265, . . . , as shown in FIG. 3(*i*).

Figure 4:
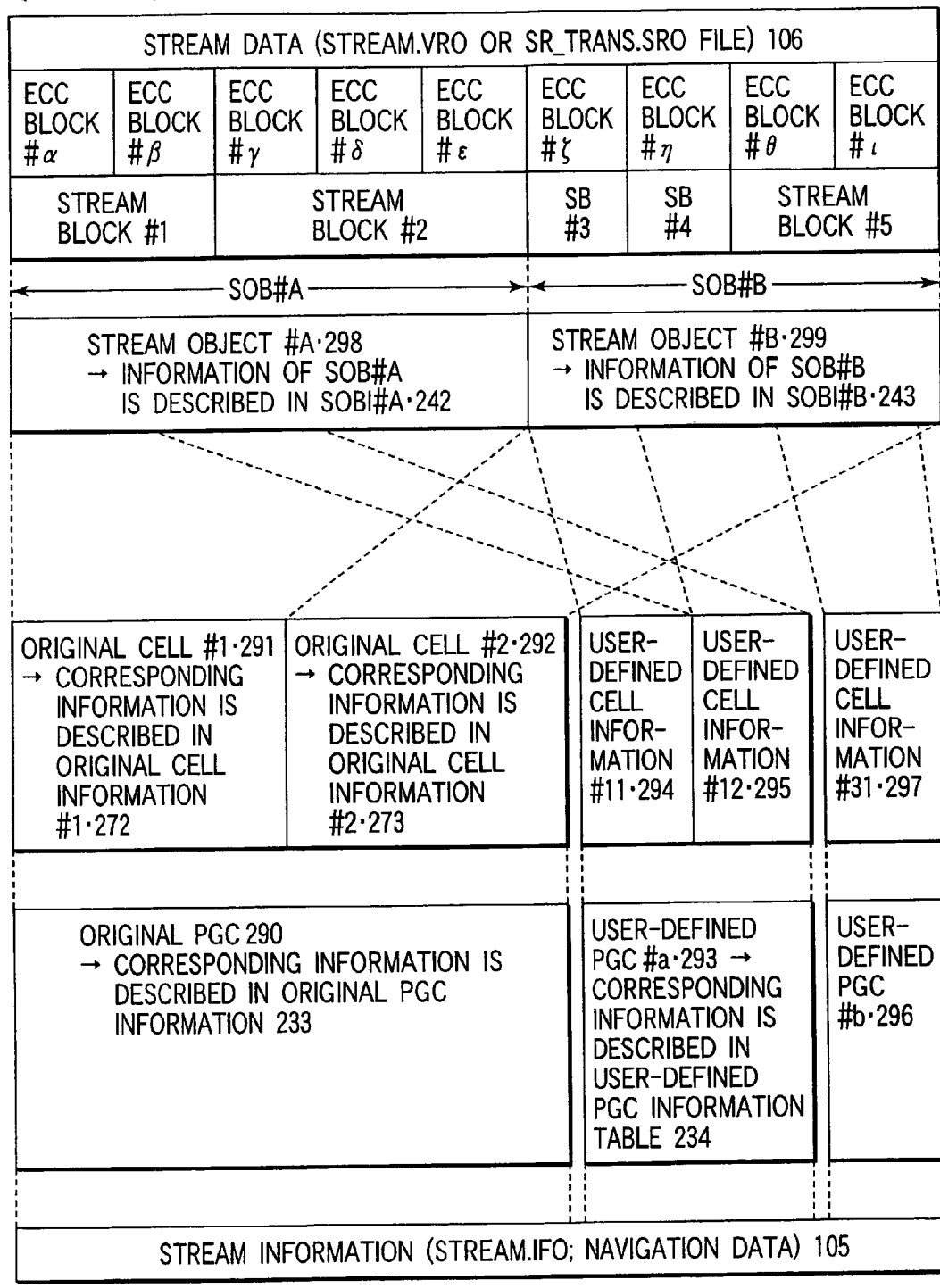
FIG. 4 is a view for explaining the relationship among stream objects (SOB), cells, program chains (PGC), and the like in the present invention.

FIG. 4 is a view for explaining the relationship among stream objects (SOB), cells, program chains (PGC), and the like in the present invention. The relationship between SOB and PGC in the present invention will be explained below using an example shown in FIG. 4.

Stream data recorded in stream data (STREAM.VRO or SR_TRANS.SRO) 106 form stream blocks as sets of one or more ECC blocks, and a recording process, partial erase process, and the like are done in units of stream blocks. The stream data form groups called stream objects in units of contents of information to be recorded (e.g., in units of programs in digital broadcast). Management information (original PGC information 233, user-defined PGC information table 234, or the like) for each stream object (SOB#A, SOB#B) recorded in this STREAM.VRO (SR_TRANS.SRO) 106 is recorded in navigation data STREAM.IFO (SR_MANGR.IFO) 105 (see lowermost portion in FIG. 4 and FIGS. 3(*e*) and 3(*f*)).

Two pieces of management information (STREAM.IFO 105) for stream objects #A•298 and #B•299 in FIG. 4 are recorded as two pieces of stream object information (SOBI) #A•242 and #B_243 in stream file information table (SFIT) 232, as shown in FIGS. 3(*f*) and 3(*g*). Each of stream object information (SOBI) #A•242 and #B•243 contains time map information 252 that mainly describes the data size, time information, and the like in units of stream blocks.

Upon playing back stream data, information (corresponding to PGCI#i in FIG. 17 to be described later) of a program chain (PGC) made up of one or more successive cells is used. Stream data can be played back in accordance with the order in which the cells that form this PGC are set. There are two types of PGCS, i.e., original PGC 290 (ORG_PGCI•233 in FIG. 3(*f*)) which can continuously play back all stream data recorded in STREAM.VRO (SR TRANS.SRO) 106, and user-defined PGCs #a•293 and #b-296 (corresponding to the contents of UD_PGCIT234 in FIG. 3(*f*)) that can arbitrary set locations and order of user's choice.

Originals cells #1•291 and #2•292 that form original PGC 290 basically have one-to-one correspondence with stream objects #A•298 and #B•299. By contrast, user-defined cells #11•294, #12•295, and #31•297 that form the user-defined PGC can set arbitrary locations within the range of one stream object #A•298 or #B•299.

Note that the sector size of each stream block can be variously set. As a preferred embodiment, a stream object unit (SOBU) made up of two ECC blocks (32 sectors) and having a constant size (64 kbytes) can be used as a stream block like stream block #1 in FIG. 4. When the stream block is fixed to be an SOBU having a constant size (e.g., 2 ECC blocks=32 sectors=64 kbytes), the following merits are obtained.

(01) Even when stream data is erased or rewritten in units of SOBUS, an ECC block of that SOBU does not influence ECC blocks of SOBUs other than the SOBU to be erased or rewritten. For this reason, ECC deinterleave/interleave upon erase or rewrite (for SOBUs other than the SOBU to be erased or rewritten) need not be done; and

(02) An access position to recorded information in an arbitrary SOBU can be specified by the number of sectors (or another parameter corresponding to the number of sectors; e.g., information of stream packs and application packets therein shown in FIG. 15 to be described later). For example, when the middle position of given SOBU#k is to be accessed, the 16th sector position (or application packet position corresponding to the 16th sector position) from the boundary between SOBU#k-1 and SOBU#k can be designated.

Figure 5:
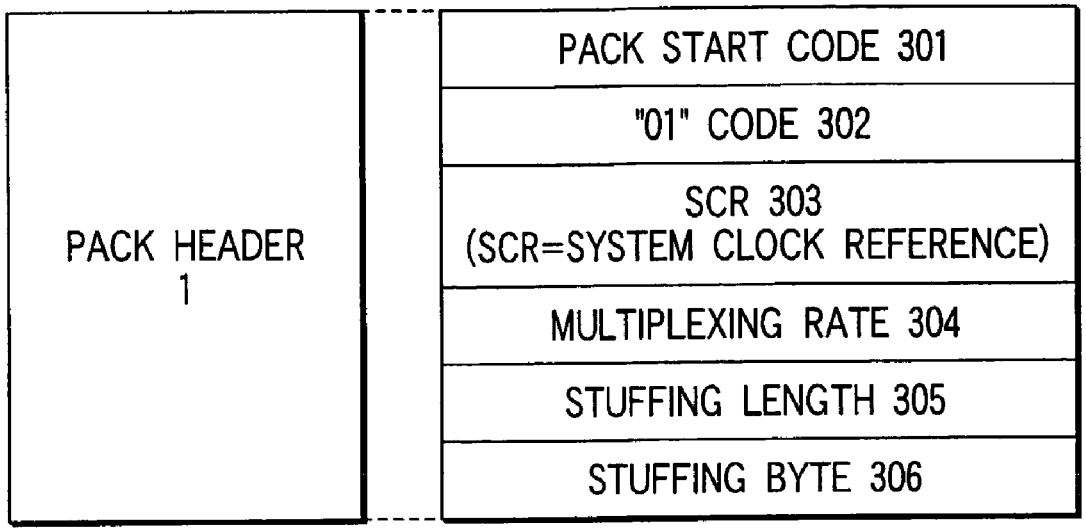
FIG. 5 is a view showing an example of the internal structure of a pack header shown in FIG. 1.

FIG. 5 shows an example of the internal structure of a pack header shown in FIG. 1. Pack header 1 consists of, e.g., 14 bytes, which include fields of pack start code 301, a "01" code, system clock reference SCR 303, multiplexing rate (e.g., 8 Mbps) 304, stuffing length 305, and stuffing byte 306. These fields describe corresponding information.

Application packet AP_PKT that arrives the streamer during recording of stream object SOB is time-stamped by the local reference clock in the streamer. The time indicated by this time stamp is application packet arrival time APAT. For the first pack in SOB, the local reference clock (corresponding to SCR 303 in FIG. 5 or SCR base in FIG. 15 to be described later) in the streamer becomes equal to APAT of the first application packet which starts within that pack.

Figure 6:
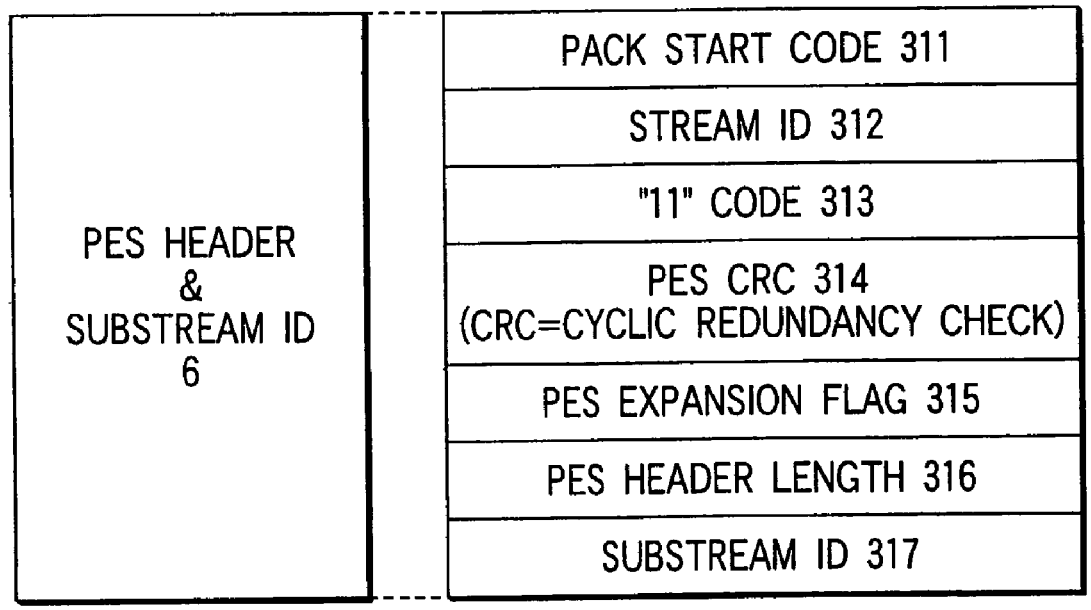
FIG. 6 is a view showing an example of the internal structure of a PES header and substream ID shown in FIG. 1.

FIG. 6 shows an example of the internal structure of a PES header & substream ID shown in FIG. 1. PES header & substream ID 6 consists of 6 bytes, which include entry fields of packet start code 311, stream ID 312, "11" code 313, PESCRC flag 314, PES expansion flag 315, PES header length 316, and substream ID 317.

Details of long and short application headers 11 and 13 will be explained below. FIG. 7 shows an example of the internal structure of long application header 11 (or 12) shown in FIG. 1(c). FIG. 8 shows an example of the internal structure of application header/short application header 13 (or 14) shown in FIG. 1(i).

As can be seen from FIGS. 7 and 8, some of the data contents in long application header 11 become the data contents of short application header 13. Short application header 13 contains commonly required information independent from the contents of stream data, and upon recording all stream data on an information storage medium, the contents of this short application header 13 are recorded together with the stream data.

Video information of digital TV broadcast is normally compressed using MPEG2. Therefore, when digital TV video information is recorded on an information storage medium as stream data, information unique to MPEG2 is required upon playback. For this reason, long application header 11 has information obtained by adding information required for playing back digital TV broadcast (MPEG2) to information of short application header 13 common to all stream data.

The information contents of long and short application headers 11 and 13 will be described in detail below with reference to FIGS. 7 and 8. In the following description, fields denoted by the same reference numerals are common to long and short application headers 11 and 13 unless otherwise specified.

Each of application headers 11 and 13 has 1-bit field 326 for storing an identification flag of long application header 11. When this identification flag is "1", it indicates a long application header; when the flag is "0", it indicates a short application header. Each of application headers 11 and 13 also has field 330 for storing service ID information corresponding to individual stream data. By linking this ID information with service information recorded at another location, unique service information for each stream data can be obtained. Also, the version number of the application header is recorded in field 321 to allow future change in the information contents of the application header.

Furthermore, each of application headers 11 and 13 describes the data length (the number of bytes) of the modified time stamp in field 322. Also, the data length (the number of bytes) of the application packet is described as the number of bytes in field 323. Moreover, the number of application packets present within the stream packet is described in field 324. The number of application packets assumes a value counted from an application packet indicated by the modified time stamp set at the head in the stream pack. In addition, the head position information of the modified time stamp set at the head in the stream pack is described as the number of bytes in field 325. Field 326 describes the identification flag of a long application header.

Note that field 327* in FIG. 8 describes a flag indicating the presence of the start application packet of SOB#B•299 in the stream pack, and field 328* in FIG. 8 describes a flag indicating the presence of the end application packet of SOB#B•299 in the stream pack.

Likewise, field 327 in FIG. 7 describes a flag indicating the presence of the start application packet of SOB#A•298 in the stream pack, and field 328 in FIG. 7 describes a flag indicating the presence of the end application packet of SOB#A_298 in the stream pack.

Field 329 in each of application headers 11 and 13 describes reference clock frequency information of the modified time stamp.

Furthermore, field 311 in long application header 11 shown in FIG. 7 describes maximum bit rate information. This is an output bit rate parameter for a model that controls the data overflow amount. Field 332 in long application header 11 describes a smooth buffer size. This is a buffer size parameter (bytes) for a model (smoothing buffer model of a streamer) that controls the data overflow amount.

FIGS. 7 and 8 have exemplified the data length (field 322) of the modified time stamp (see FIG. 1(b)) and the reference clock frequency (field 329) of the modified time stamp. However, the present invention is not limited to such specific information. In some embodiments of this invention, a time stamp immediately after reception can be directly recorded on an information storage medium without re-appending the time stamp. In such case, the data length (field 322) of a normal time stamp and/or the reference clock frequency (field 329) of the normal time stamp can be used.

The smoothing buffer model is defined to limit the average bit rate and instantaneous disconnection of application data recorded in SOB. Complete pack data including a packet header, PES header, application header, application time stamp, and stuffing is stored in a smoothing buffer of this model. Upon removing the application packet from the smoothing buffer, all data bytes stored between the start byte of that application packet and the end byte of a previous application packet are instantaneously deleted from the smoothing buffer.

If SOB is recorded on a medium (DVD-RAM disc or the like) so that an MPEG2 program stream can be introduced into the smoothing buffer and all application packets can be removed from the smoothing buffer on the basis of playback timings which are defined by the application time stamp and are normally reconstructed, it is interpreted to obey the limitation imposed by the smoothing buffer model of the streamer. This limitation can be defined in correspondence with the smoothing buffer size and the maximum value (10.08 Mbps) of the maximum program multiplexing rate (304 in FIG. 5 or program multiplexing rate in FIG. 15(*e*)) of the MPEG2 program stream.

When application data which are enough to form a pack are stored in the smoothing buffer during recording (video recording), the pack can be immediately transferred from the smoothing buffer to a track buffer. A condition therefor is satisfied (1) when a pack is completely filled with application packs or (2) when the difference between system clock reference SCR and local clock (27 MHz) has exceeded a predetermined threshold value (time value expressed by seconds).

Let SCR_prev be SCR of a previous pack. In this case, SCR of subsequent packs which do not contain any start of application packets can be obtained by "SCR=SCR_prev+2,048×8 bits/10.08 MHz".

On the other hand, SCR of subsequent packs that include at least one start of application packets can be obtained by "SCR=(SCR_prev+2,048×8 bits/10.08 MHz; or a maximum value of APAT[40 . . . 0]". Note that APAT indicates the arrival time of the first application packet that starts within the corresponding pack.

SCR for the first pack in SOB becomes equal to APAT of the start application packet which starts within that pack. For example, "SCR[40 . . . 0]=APAT[40 . . . 0]". SCR[41] next to this SCR[40 . . . 0] becomes zero. Note that [40 . . . 0] of SCR[40 . . . 0] indicates the contents of information bits (40) to (0) which forms this SCR, and [40 . . . 0] of APAT[40 . . . 0] indicates the contents of information bits (40) to (0) which forms this APAT. Likewise, [41] of SCR[41] indicates the contents of information bit (41) which forms this SCR.

Upon exemplifying using firmware programming, the aforementioned process can be expressed by:

if (*APAT*[40 . . . 0]>(*SCR*_prev+2048*8 bits/10.08 Mbps)), then

```
SCR[40 . . . 0] = APAT[40 . . . 0]
SCR[41] = 0
else
   SCR[40 . . . 0] = (SCR_prev +
2048*8bits/10.08Mbps)[40 . . . 0]
   SCR[41] = 0
endif"
```

When the smoothing buffer becomes full of data during playback, a process for outputting application packets can be immediately started.

Figure 9:
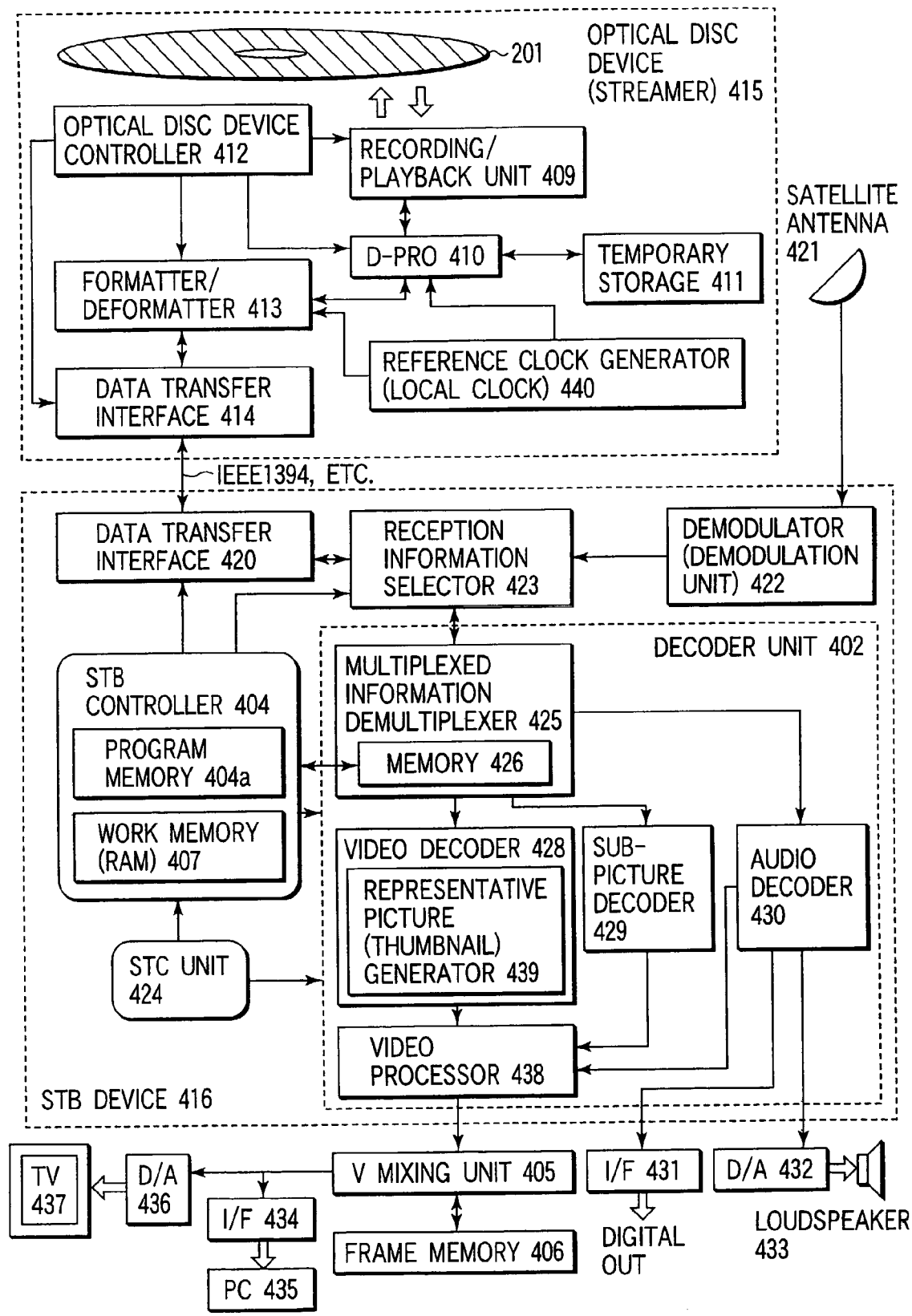
FIG. 9 is a block diagram for explaining the arrangement of a recording/playback system (optical disc device/streamer and STB device) according to an embodiment of the present invention.

FIG. 9 is a block diagram for explaining the arrangement of a stream data recording/playback system (optical disc device/ streamer and STB device) according to an embodiment of the present invention. This embodiment assumes as information storage medium 201 a recordable/reproducible optical disc such as a DVD-RAM disc or the like.

This stream data recording/playback apparatus comprises optical disc device (streamer) 415, STB device 416, and their peripheral devices. The peripheral devices include video mixing unit 405, frame memory 406, external loudspeaker 433, personal computer (PC) 435, monitor TV 437, D/A converters 432 and 436, I/F units 431 and 434, and the like.

Optical disc device 415 comprises recording/playback unit 409 including a disc drive, data processor (to be abbreviated as D-PRO hereinafter) 410 for processing stream data to recording/playback unit 409 (or stream data from recording/ playback unit 409), temporary storage 411 for temporarily storing stream data that overflows from D-PRO 410, and optical disc device controller 412 for controlling operations of recording/playback unit 409 and D-PRO 410.

Optical disc device 415 further comprises data transfer interface 414 for receiving stream data sent from STB device 416 via IEEE1394 or the like (or sending stream data to STB device 416 via IEEE1394 or the like), and formatter/deformatter 413 for converting the stream data received by data transfer interface 414 into a signal format that can be recorded on information storage medium (RAM disc) 201 (or converting the stream data played back from medium 201 into a signal format for, e.g., IEEE1394 or the like).

More specifically, the IEEE1394 reception side of data transfer interface 414 reads the time from the start of stream data transfer on the basis of the time count value of reference clock generator (local clock) 440. Based on this time count value (time information), delimiter information for dividing stream data in units of stream blocks (or in units of SOBUs) is generated, and cell division information, program division information, and PGC division information are generated in correspondence with this delimiter information.

Formatter/deformatter 413 converts the stream data sent from STB device 416 into a stream pack sequence, and inputs the converted stream pack sequence to D-PRO 410. Each of the input stream packs has a constant size of 2,048 bytes, which is equal to the sector size. D-PRO 410 combines the input stream packs in units of 16 sectors to form ECC blocks, and sends the ECC blocks to recording/playback unit 409.

When recording/playback unit 409 is not ready to record data on medium 201, D-PRO 410 transfers recording data to temporary storage 411 to temporarily save them therein, and waits until recording/playback unit 409 is ready to record data. When recording/playback unit 409 is ready to record data, D-PRO 410 transfers data saved in temporary storage 411 to recording/playback unit 409. In this manner, recording on medium 201 is started. Upon completion of recording of data saved in temporary storage 411, the subsequent data are seamlessly transferred from formatter/deformatter 413 to D-PRO 410. Assume that a large-size memory is used as temporary storage 411 so as to store recording data for several minutes or more by high-speed access.

Note that time stamp information appended to the recording bitstream via formatter/deformatter 413 can be obtained from reference clock generator 440. On the other hand, time stamp information (SCR) extracted from the playback bitstream via formatter/deformatter 413 can be set in reference clock generator 440.

Each pack header in the stream data recorded on information storage medium 201 records a reference clock (system clock reference SCR). When the stream data (SOB or SOBU) recorded on this medium 201 is played back, reference clock generator 440 is adjusted to the reference clock (SCR) played back from medium 201 (the SCR value is set in reference clock generator 440). That is, in order to play back SOB or SOBU data, the reference clock (reference clock generator 440) in the streamer (optical disc device 415) is adjusted to system clock reference SCR described in the first stream pack from which playback starts. After that, reference clock generator 440 is automatically counted up.

STB unit 416 comprises demodulator 422 for demodulating the contents of a digital broadcast wave received by satellite antenna 421, and providing demodulated data (stream data) that multiplexes one or more programs, and reception information selector 423 for selecting information of a specific program (of user's choice) from data demodulated by demodulator 422. When the information (transport packet) of the specific program selected by reception information selector 423 is to be recorded on information storage medium 201, selector 423 sends stream data containing only the transport packet of the specific program to data transfer interface 414 of optical disc device 415 by IEEE1394 transfer via data transfer interface 420 in accordance with an instruction from STB controller 404. When the user merely reviews the information (transport packet) of the specific program selected by reception information selector 423 without recording it, selector 423 sends stream data containing only the transport packet of the specific program to multiplexed information demultiplexer 425 of decoder unit 402 in accordance with an instruction from STB controller 404.

On the other hand, when a program recorded on information storage medium 201 is to be played back, stream data sent from optical disc device 415 to STB device 416 via an IEEE1394 serial bus is sent to multiplexed information demultiplexer 425 of decoder unit 402 via selector 423. Multiplexed information demultiplexer 425 classifies various packets (video packets, audio packets, sub-picture packets, and the like) contained in the stream data sent from selector 423 on internal memory 426 on the basis of their IDs. Then, demultiplexer 425 distributes the classified packets to corresponding decoders (video decoder 428, sub-picture decoder 429, and audio decoder 430).

Video decoder 428 decodes (MPEG-encoded) video packets sent from multiplexed information demultiplexer 425 to generate moving picture data. Video decoder 428 incorporates representative image (thumbnail) generator 439 to provide a function of generating a reduced-scale picture (thumbnail picture) that represents the recorded contents from I-picture in MPEG video data in such case. Moving picture data (and/or the representative image generated by generator 439) decoded by video decoder 428, sub-picture data (information of superimposed dialogs, menus, and the like) decoded by sub-picture decoder 429, and audio data decoded by audio decoder 430 are sent to video mixing unit 405 via video processor 438.

Video mixing unit 405 generates a digital video by superposing the superimposed dialogs and the like on the moving picture using frame memory 406. This digital video is converted into an analog video via D/A converter 436, and the analog video is sent to monitor TV 437. Also, the digital video from video mixing unit 405 is fetched as needed by personal computer 435 via I/F unit 434 and a signal line such as IEEE1394 or the like. On the other hand, digital audio information decoded by audio decoder 430 is sent to external loudspeaker 433 via D/A converter 432 and an audio amplifier (not shown). Also, decoded audio information is digitally output to an external device via I/F unit 431. Note that the operation timing in STB device 416 is determined by clocks from system time counter (STC) 424.

The aforementioned instructions and the like from STB controller 404 (operation control of the internal components of STB device 416) are executed by a control program stored in program memory 404a. In this case, work memory (RAM) 407 is used as needed in the control process of STB controller 404.

In the stream data recording/playback apparatus shown in FIG. 9, a stream data transfer process is done between optical disc device 415 and STB device 416 via data transfer interfaces 414 and 420. As information required to smoothly transfer digital TV video information compressed by MPEG2 without any interruption, information of the maximum bit rate (maximum transfer rate of information) upon transferring information between data transfer interfaces 414 and 420 is recorded in field 327 (FIG. 7) of long application header 11. Also, information required for guaranteeing real-time continuous transfer of MPEG2 video information between data transfer interfaces 414 and 420 of optical disc device 415 and STB device 416, i.e., the memory size that the data transfer interfaces 414 and 420 must assure therein is recorded in field 332 in FIG. 7 as the smooth buffer size.

The internal operation timings of STB device 416 including STB controller 404 and decoder unit 402 can be restricted by clocks from STC unit 424. By synchronizing reference clock generator 440 of optical disc device 415 with STC unit 424 of STB device 416, the operation timings of the overall streamer system including optical disc device 415 and STB device 416 can be restricted.

As a method of synchronizing reference clock generator 440 with STC unit 424, a method of setting reference clock generator 440 and STC unit 424 using a reference clock (SCR) in stream data exchanged between data transfer interfaces 414 and 420 is available.

More specifically, the internal local reference clock (440) is set in APAT of the first application packet that starts within the first pack in SOB included in stream data sent from STB device 416 to optical disc device (streamer) 415.

The device arrangement in STB device 416 shown in FIG. 9 can be functionally divided/categorized into a "reception time management module", "stream data content analysis module", "stream data transfer module", and "time related information generation module".

Note that the "reception time management module" is comprised of demodulator (demodulation unit) 422, reception information selector 423, multiplexed information demultiplexer 425, STB controller 404, and the like. The "reception time management module" receives digital TV broadcast via satellite antenna 421, and records reception times in units of transport packets in the received broadcast information.

The "stream data content analysis module" is comprised of multiplexed information demultiplexer 425, STB controller 404, and the like. This "stream data content analysis module" analyzes the contents of the received stream data, and extracts I-, B-, and P-picture positions and/or PTS (presentation time stamp) values.

The "stream data transfer module" is comprised of multiplexed information demultiplexer 425, reception information selector 423, STB controller 404, data transfer interface 420, and the like. This "stream data transfer module" transfers the stream data to optical disc device 415 while holding differential reception time intervals in units of transport packets.

The "time related information generation module" is comprised of multiplexed information demultiplexer 425, STB controller 404, data transfer interface 420, and the like. The "time related information generation module" generates relationship information between reception time (time stamp) information recorded by the "reception time management module" and display time information (PTS value and/or the number of fields) extracted by the "stream data content analysis module".

In an embodiment of the present invention, application packets (transport packets) fetched by STB device 316 can be recorded on disc 201 while holding their time intervals, and can be played back (sent from the optical disc device to the STB device) while holding the time intervals between packets upon reception. In this case, since the reference clock frequency (STC 424) in STB device 416 is different from that (local clock 440) in optical disc device 415, time stamps are re-appended before recording by optical disc device 415 to record clocks in optical disc device 415 in pack headers. In this manner, upon playback, application packets can be sent from optical disc device 415 to STB device 416 while holding the time intervals between packets upon reception. As a result, in STB device 416 application packets fetched by multiplexed information demultiplexer 425 via data transfer interface 420 and reception information selector 423 can be decoded by the same process as that executed when they are fetched via satellite antenna 421.

That is, the aforementioned "reception time management module" functions, and stores the reception times (fetch times) of application packets and the application packets themselves in memory 426 of multiplexed information demultiplexer 425. The "stream data content analysis module" analyzes information in each application packet stored in memory 426, and recognizes a transport packet header as its header, and payload (see FIG. 14). As the type of payload, picture information, audio information, sub-picture information, data, text information, and the like are included. Each information is appended with PTS (presentation time stamp or playback time stamp). Since a transport packet header contains identification information and various kinds of attribute information, which indicate the type of data of a payload that follows the header, picture information, audio information, sub-picture information, or the like, and PTS corresponding to each information are extracted in accordance with such information.

Video decoder 428, audio decoder 430, and sub-picture decoder 429 respectively receive and decode the extracted information. A video signal from video decoder 428 and a sub-picture signal from sub-picture decoder 429 are input to video processor 438. Video processor 438 executes a composition process of the decoded video and sub-picture signals, and other processes required for the video signal. The video signal output from video processor 438 is input to D/A converter 436 via video mixing unit 405, and is converted into an analog signal, which is monitored on television receiver 437.

Frame memory 406 is connected to video mixing unit 405, and is used as a temporary storage in a mixing process. The digital output (including video, sub-picture, and audio) from mixing unit 405 can be supplied to personal computer 435 via interface 434. The output from audio decoder 430 can be output as a digital output via interface 431. Audio data is converted into an analog signal via D/A converter 432, and the analog signal is input to loudspeaker 433.

As described above, the apparatus shown in FIG. 9 can play back data (send data from the optical disc device to the STB device) while holding the time intervals between packets upon reception. However, this does not mean that physically recorded locations are not intermittent on recording medium 201. In some cases, physically recorded locations may have intervals, but recording is basically continuously done. However, since neighboring packets have a time interval therebetween on time information, as described above, the data playback amount from the recording medium sometimes exceeds the data processing amount per unit time of the STB device. In such case, a kickback function of the optical disc device is enabled, i.e., some of fetched playback data are discarded, and are read again from storage medium 201. In this fashion, application packets are sent to the STB device at the same timings as those they were received by the antenna.

Figure 10:
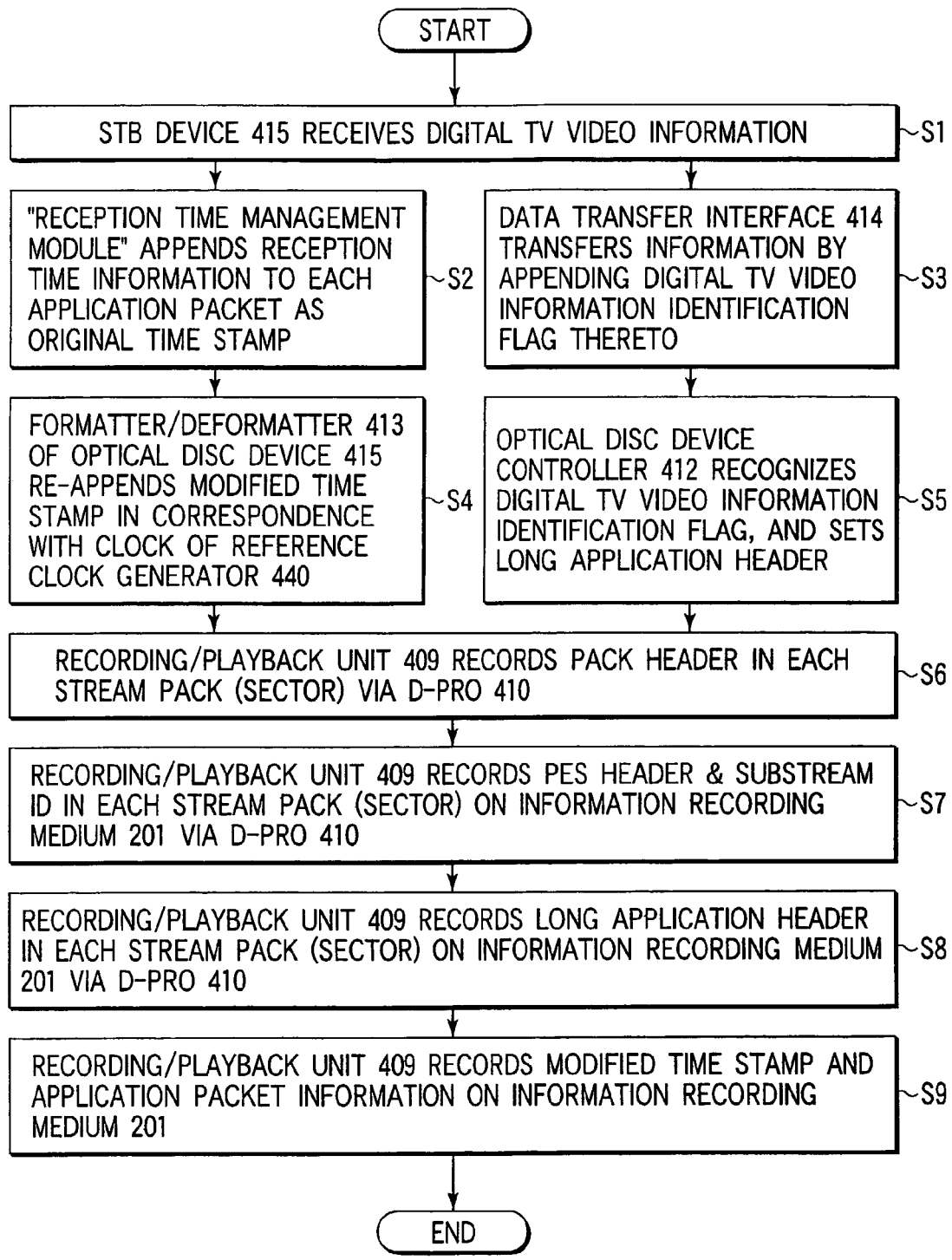
FIG. 10 is a flow chart for explaining the stream data recording sequence according to an embodiment of the present invention.

FIG. 10 is a flow chart for explaining the stream data recording sequence according to an embodiment of the present invention. STB device 416 in FIG. 9 receives video information of digital TV broadcast (step S1). In general, a plurality of programs are time-divisionally multiplexed in a single transponder in the received information in digital TV broadcast. Reception information selector 423 extracts application packets of a specific program alone from the received information.

In the "reception time management module" described in FIG. 9, required program information is temporarily saved in memory 426 in multiplexed information demultiplexer 425. At the same time, the "reception time management module" begins to measure the reception times in units of application packets, and appends the measured values to individual application packets as original time stamps shown in FIG. 1(a) (step S2). Note that the original time stamp is a time stamp used upon sending data (sending each application packet) on the basis of the IEEE1394 standards. The appended original time stamp information is recorded in memory 426.

The "stream data content analysis module" described in FIG. 9 analyzes information in application packets recorded in memory 426. More specifically, a process for detecting picture boundary positions from the application packet sequence, and an extraction process of PTS (presentation time stamp) information are executed. Also, the "stream data content analysis module" checks based on the stream data contents if the received information is video information of digital TV broadcast. After the aforementioned processes, stream data are transferred to data transfer interface 420 in synchronism with the timings of the original time stamps.

Upon transferring stream data between data transfer interfaces 414 and 420, a digital TV video information identification flag generated inside data transfer interface 414 is appended simultaneously with the data transfer (step S3).

In optical disc device 415, time stamps are re-appended (modified time stamps are re-appended) to application packets output from data transfer interface 414 in synchronism with reference clocks generated by reference clock generator 440 in that device (step S4).

By re-appending the time stamps, the local reference clock (440) inside streamer 415 is set in APAT of the first application packet that starts within the first pack in stream object SOB contained in stream data sent from STB device 416 to optical disc device (streamer) 415. In other words, application packet AP_PKT that arrives the streamer during recording of SOB is time-stamped by the local reference clock inside the streamer (the time indicated by this time stamp is application packet arrival time APAT), and the local reference clock (corresponding to SCR 303 in FIG. 5 or SCR base in FIG. 15 to be described later) inside the streamer becomes equal to APAT of the first application packet that starts within the first pack in SOB.

Parallel to the time stamp re-appending process in step S4, optical disc device 415 recognizes the digital TV video information identification flag, and sets long application header 11 shown in FIG. 1(c) or 7 (step S5).

In a process for recording stream data on information storage medium 201, D-PRO (digital processor) 410 in FIG. 9 makes data control, and recording/playback unit 409 operates (steps S6 to S9). At this time, pack header 1, PES header & substream ID 6, and long application header 11 are recorded in units of sectors, and the modified time stamp and application packets are sequentially recorded in data area 21, as shown in FIG. 1(*c*).

Note that pack header 1 records SCR 303 (corresponding to SCR base in FIG. 15 to be described later) shown in FIG. 5. As time information upon recording stream data on information storage medium 201, the count value of clocks output from reference clock generator 440 is recorded as this SCR information.

The contents of steps S6 to S9 will be explained in more detail below. Recording/playback unit 409 records pack headers on the information storage medium in units of stream packs (sectors) via D-PRO 410 (step S6). Recording/playback unit 409 then records PES headers & substream IDs on the information storage medium in units of stream packs (sectors) via D-PRO 410 (step S7). Subsequently, recording/playback unit 409 records long application headers on the information storage medium in units of stream packs (sectors) via D-PRO 410 (step S8). Finally, recording/playback unit 409 records modified time stamps and application packets on the information storage medium in units of stream packs (sectors) via D-PRO 410 (step S9).

After the above processes, optical disc device (or streamer) 415 in FIG. 9 can use time information (modified time stamp/ SCR) generated using reference clocks from reference clock generator 440 as information for obtaining the output/transfer timings of data.

In other words, the aforementioned processes can be expressed as follows. That is, upon recording stream data on an information medium, first recording units (stream packs/ sectors) and second recording units (application packets) for recording the stream data are prepared. First header (pack header) information is recorded for each first recording unit (stream pack/sector), time information (time stamp) is recorded for each second recording unit (application packet), and the stream data is recorded for each second recording unit (application packet). Predetermined system clock information is recorded in the first header (pack header) information, and the time information (time stamp) recorded for each second recording unit (application packet) is set in correspondence with the value of the predetermined system clock value (step S4).

Figure 11:
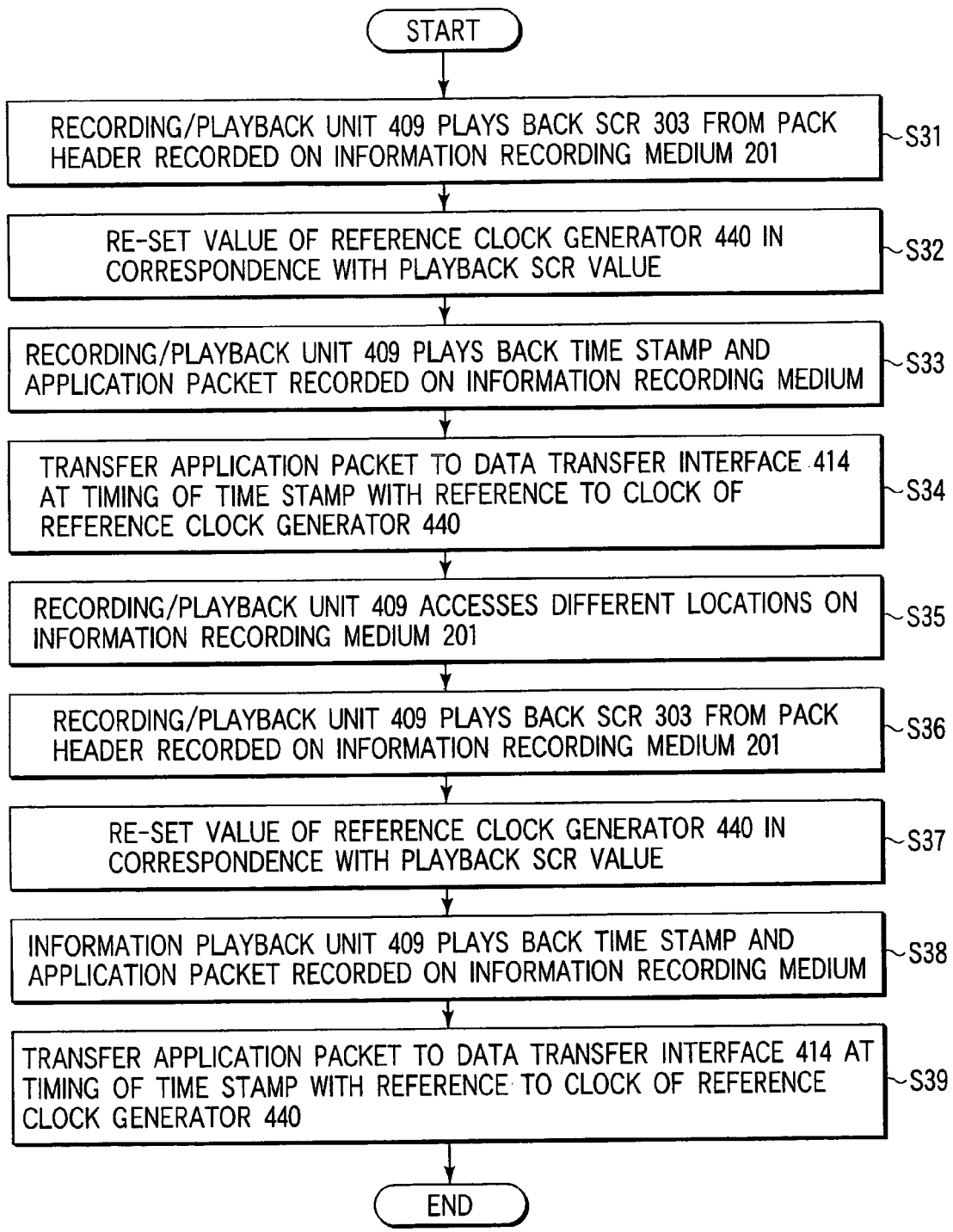
FIG. 11 is a flow chart for explaining the stream data playback sequence according to an embodiment of the present invention.

FIG. 11 is a flow chart for explaining the stream data playback sequence according to an embodiment of the present invention. In this playback sequence, playback begins from pack header 1 (step S31).

Pack header 1 records the count value of clocks output from reference clock generator 440 as time information upon recording stream data, and an initial value of reference clock generator 440 is re-set in correspondence with that value (step S32).

Immediately after the re-set process, recording/playback unit 409 in FIG. 9 plays back time stamps and application packets recorded on information storage medium 201, and playback data is temporarily saved in temporary storage 411 (step S33).

The modified time stamp recorded on information storage medium 201 is set in correspondence with SCR 303 mentioned above. Hence, when the count value of reference clocks generated by reference clock generator 440 matches the value of the modified time stamp, the modified time stamp and its associated application packet which are temporarily recorded in temporary storage 411 are transferred to data transfer interface 414 (step S34).

Data transfer interface 414 re-appends a time stamp value in correspondence with its internal reference clock, and information transferred from temporary storage 411 is sent to data transfer interface 420.

When an optical head (not shown) in recording/playback unit 409 accesses and plays back stream data which are recorded at different locations on information storage medium 201, continuity of the modified time stamps is disturbed. Hence, when the optical head accesses stream data recorded at different locations on information storage medium 201 (step S35) and begins to play them back at largely separate positions on the information storage medium, the following process is done. That is, recording/ playback unit 409 in FIG. 9 plays back SCR 303 from a pack header recorded on information storage medium 201 (step S36), and re-sets the value of reference clock generator 440 in correspondence with the playback SCR value (step S37).

With this process, the SCR value obtained from reference clock generator 440 can be synchronized with the time stamps of packets to be played back. After such synchronization is established, recording/playback unit 409 plays back time stamps and application packets recorded on the information storage medium (step S38). Finally, when the count value of reference clocks generated by reference clock generator 440 matches the value of the modified time stamp, the modified time stamp and its associated application packet which are temporarily recorded in temporary storage 411 are transferred to data transfer interface 414 (step S39).

The playback information transferred to data transfer interface 414 is sent to STB device 416 via an IEEE1394 line or the like, and undergoes a required decoding process. The decoded information (recorded contents on medium 201) is played back via TV 437, loudspeaker 433, and the like in FIG. 9.

In other words, the aforementioned processes can be expressed as follows. That is, when recorded information is played back from an information medium (201) on which stream objects (SOB) are recorded in a format in which a set of one or more stream objects (SOB) that represent playback data for a recorded bitstream form stream data, each stream object (SOB) is made up of one or more stream packs (S_PCK), each stream pack (S_PCK) is made up of a pack header and a stream packet (S_PKT), the pack header includes predetermined time information (SCR), the stream packet includes one or more application packets (AP_PKT) appended with predetermined time stamps (ATS), an input application packet (AP_PKT) (to the streamer) is timestamped by a local reference clock (440 in FIG. 9) (inside the streamer) corresponding to the predetermined time information (SCR), and the time stamp information is recorded in each stream pack (S_PCK), a reference clock for playback is set on the basis of the local reference clock (SCR 303 in FIG. 5, SCR base in FIG. 15) played back from the information medium (201) (step S37), and the contents of the bitstream are played back from the information medium (201) on the basis of the set reference clock (SCR) for playback.

In still other words, the aforementioned processes can be expressed as follows. That is, when recorded information is played back from a medium on which bitstream information which has first header (pack header) information in which system clock information is recorded for each first recording unit (stream pack/sector), stream data recorded for each second recording unit (application packet), and time information (time stamp) recorded for each second recording unit (application packet), the system clock information is played back from the first header (pack header) information (step S36), a reference clock is re-set based on the playback system clock information (step S37), the time information (time stamp) recorded for each second recording unit (application packet) is played back (step S38), contents of the bitstream information recorded on the medium are output in accordance with the time information (time stamp) played back based on the re-set reference clock (step S39).

FIG. 12 is a block diagram for explaining the arrangement of a recording/playback system (a stream data recording/playback apparatus that integrates an optical disc device and STB device) according to another embodiment of the present invention.

The stream data recording/playback apparatus in this embodiment comprises encoder unit 401, decoder unit 402, STB 403, main MPU 454, V (video) mixing unit 405, frame memory 406, key input unit 457, display unit 458, recording/playback unit (disc drive) 409 for recording or playing back information on or from information storage medium (DVD-RAM disc or the like) 201, data processor (D-PRO) 410, temporary storage 411, A/V (audio/video) input unit 442, and TV tuner 443. Also, the apparatus comprises digital signal input unit 441 to allow to receive, e.g., TV phone video information compressed by MPEG4, or digital audio information on an MD (mini disc), CD (compact disc), etc., and the like in addition to digital TV video information, and to record the received information on information storage medium 201 as stream data.

This stream data recording/playback apparatus further comprises satellite antenna 421 connected to STB 403, system time counter (STC) 424, interface (I/F) 434 for sending a digital video signal from video mixing unit (V mixing unit) 405 to personal computer (PC) 435, and D/A converter 436 for analog TV 437.

Note that V mixing unit 405 has a function of mixing a digital video signal from V-PRO 438 of decoder 402, and digital video signal 453 from STB 403 as needed. With this mixing function, for example, a broadcast picture from STB 403 can be displayed on the left side of the display screen of TV 437, and a picture played back from disc 201 can be displayed on the right side of the display screen of TV 437. Alternatively, the broadcast picture from STB 403 and the playback picture from disc 201 can be displayed to overlap each other on overlapping windows on the monitor screen of PC 435.

In the aforementioned arrangement, encoder unit 401 includes A/D converter 444 for video and audio, selector 445 for selecting a digital video signal from A/D converter 444, digital video signal 453 from STB portion 403, or a digital signal from digital signal input unit 441, and sending the selected signal to video encoder 446, video encoder 446 for encoding the video signal from selector 445, audio encoder 447 for encoding an audio signal from A/D converter 444, SP encoder 448 for encoding a closed caption (cc) signal, teletext signal, or the like from TV tuner 443 to obtain sub-picture (SP) data, formatter 449, and buffer memory 450 for temporarily storing data.

On the other hand, decoder unit 402 is comprised of separator 425 that incorporates memory 426, video decoder 428 that incorporates reduced-scale picture generator (thumbnail picture generator) 439, SP decoder 429, audio decoder 430, TS packet (transport packet) transfer unit 427, video processor (V-PRO) 438, and audio D/A converter 432.

A digital audio signal decoded by audio decoder 430 can be externally-output via-interface (I/F) 431. Also, an analog audio signal obtained by converting the digital audio signal into an analog signal by D/A converter 432 drives loudspeaker 433 via an external audio amplifier (not shown). D/A converter 432 can D/A-convert not only a digital audio signal from audio decoder 430 but also digital audio signal 452 from STB 403.

When playback data from disc 201 is transferred to STB 403, TS packet transfer unit 427 can convert playback data (bitstream) from separator 425 into transport packets (TS packets) and can send these TS packets to STB 403 by adjusting the transfer time to time information from STC 424.

Main MPU 454 in FIG. 12 includes work RAM 454a used as a work memory, a control program named stream data generation controller 454b, a control program named stream data playback controller 404c, a control program named stream data partial erase/temporary erase controller 454d, and the like. Video recording control in the stream data recording/playback apparatus is done by main MPU 454 using the aforementioned control programs (sequential control programs).

In order to read/write the file management area (navigation RTR.IFO 104, STREAM.IFO 105 in FIG. 2 or FIG. 3(e)) and the like, main MPU 454 is connected to D-PRO 410 via a dedicated microcomputer bus.

The flow of a video signal upon video recording in the apparatus shown in FIG. 12 will be explained first. In video recording, a series of processes are executed in accordance with the sequential program named stream data generation controller 454b in main MPU 454. More specifically, stream data output from STB 403 to encoder unit 401 via a transmission path complying with IEEE1394 is transferred to formatter 449. The IEEE1394 reception side of formatter 449 reads the time from the start of stream data transfer on the basis of the time count value of STC 424. The read time information is sent as management information to main MPU 454, and is saved in work RAM 454a.

Main MPU 454 generates delimiter information for dividing stream data in units of stream blocks (in units of VOBUs in a video recorder, in units of SOBUs in the streamer) on the basis of the time information, also generates cell division information, program division information, and PGC division information corresponding to the delimiter information, and records them in work RAM 454a in main MPU 454.

Formatter 449 converts stream data sent from STB 403 into a stream pack sequence in accordance with the instruction from stream data generation controller 454b of main MPU 454, and inputs the converted stream pack sequence to D-PRO 410. Each of the input stream packs has a constant size of 2,048 bytes, which is equal to the sector size. D-PRO 410 combines the input stream packs in units of 16 sectors to form ECC blocks, and sends the ECC blocks to disc drive 409. Disc drive 409 executes a modulation process suitable for data recording, and records data on medium 201 via an optical head (not shown).

When disc drive 409 is not ready to record data on DVD-RAM disc (information storage medium) 201, D-PRO 410 transfers recording data to temporary storage 411 to temporarily save them therein, and waits until disc drive 409 is ready to record data. When disc drive 409 is ready to record data, D-PRO 410 transfers data saved in temporary storage 411 to disc drive 409. In this manner, recording on disc 201 is started. Upon completion of recording of data saved in temporary storage 411, the subsequent data are seamlessly transferred from formatter 449 to D-PRO 410. Note that a large-size memory is used as temporary storage 411 so as to store recording data for several minutes or more by high-speed access.

Data processes upon playback will be explained below. In playback control in the stream data recording/playback apparatus, main MPU 454 executes a series of processes in accordance with the sequential program named stream data playback controller 454c. Disc drive 409 plays back stream data from RAM disc (information storage medium) 201. The played-back stream data is transferred to decoder unit 402 via D-PRO 409.

In decoder unit 402, separator 425 receives transport packets in the played-back stream data. Separator 425 transfers video packet data (MPEG video data) to video decoder 428, audio packet data to audio decoder 430, and sub-picture packet data to SP decoder 429 in accordance with stream IDs and substream IDs.

Video data decoded by video decoder 428 is converted into an analog TV signal via V mixing unit 405 and D/A converter 436, and the analog TV signal is transferred to TV 437 to display a picture. At the same time, an audio signal decoded by audio decoder 430 is sent to D/A converter 432, and is converted into digital audio data. The converted digital audio data is transferred to a digital input of an external audio equipment (not shown) via I/F 431. Alternatively, the converted digital audio data is converted into an analog audio signal by D/A converter 432, and is sent to loudspeaker 433 via an audio amplifier (not shown).

The stream data recording/playback apparatus shown in FIG. 12 does not have data transfer interfaces 414 and 420 shown in FIG. 9, since it adopts an arrangement in which disc drive 409 and STB 403 are integrated. Also, since this apparatus has a reference clock generator, i.e., STC 424, which is common to the entire system, the need for a time stamp re-appending process (modified time stamps) can be obviated. Furthermore, since the apparatus has digital signal input unit 441, TV phone video information compressed by MPEG4, PCM audio information on an MD (mini disc), CD (compact disc), etc., and the like can be input in addition to digital TV video information, and can be recorded as stream data on information storage medium 201.

Although the need for a time stamp re-appending process (modified time stamps) can be obviated, "a local reference clock in the streamer must be set to be equal to APAT of the first application packet that starts within the first pack in SOB" upon stream recording.

When playback is made in the apparatus shown in FIG. 12, recorded data on information storage medium 201 are read via an optical head (not shown). Recording/playback unit 409 executes a demodulation process of the read data, and demodulated data are input to D-PRO 410 and undergo an error correction process and the like. The demodulated data are input to multiplexed information demultiplexer 425. Multiplexed information demultiplexer 425 executes the same signal process as that described in FIG. 9. Video decoder 428 comprises reduced-scale picture generator 439 (representative picture generator in FIG. 9), which generates an edit or index picture.

Figure 13:
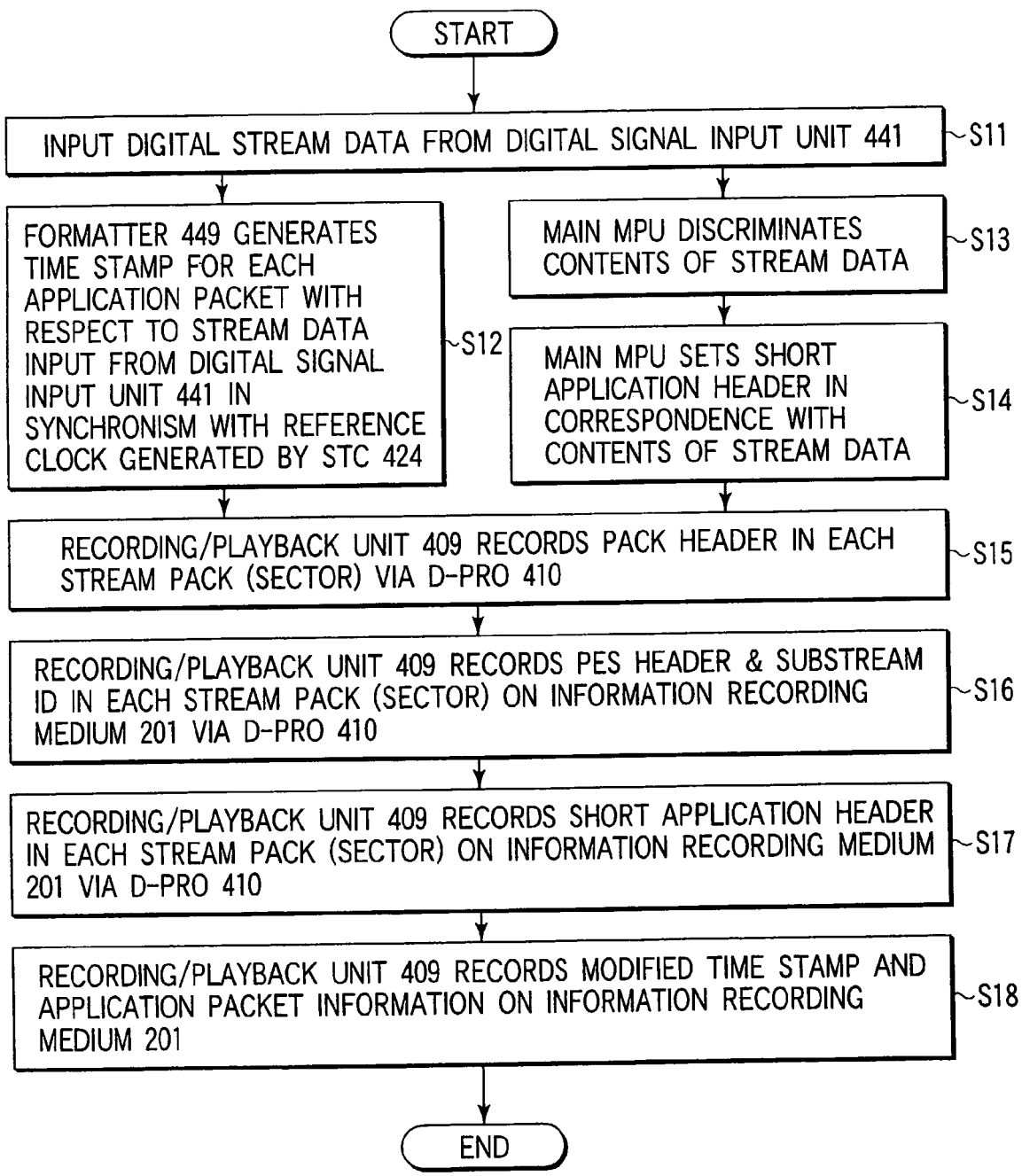
FIG. 13 is a flow chart for explaining the stream data recording sequence (using a short application header) according to another embodiment of the present invention.

FIG. 13 is a flow chart showing the stream data recording sequence (using a short application header) according to another embodiment of the present invention. For example, digital stream data is input from digital signal input unit 441 in FIG. 12 (step S11). For the input stream data, formatter 449 in FIG. 12 generates time stamps in units of application packets in synchronism with reference clocks generated by STC 424 (step S12). Parallel to this process, main MPU 454 discriminates the contents of the input stream data (step S13), and sets a short application header in correspondence with the discriminated contents (step S14).

The time indicated by each time stamp generated in step S12 corresponds to application packet arrival time APAT mentioned above. That is, the local reference clock (corresponding to SCR 303 in FIG. 5 or SCR base in FIG. 15 to be described later) becomes equal to APAT of the first application packet that starts within the first pack in SOB.

The subsequent processes (steps S15 to S18) in FIG. 13 are the same as those in steps S6 to S9 described with reference to FIG. 10, except that the application header recorded in step S17 is a short application header.

FIG. 14 is a view for explaining, especially, the data structure in the data area in the data structure according to an embodiment of the present invention. FIG. 14 exemplifies the structure of data stored in the data areas (21 to 23) in FIG. 1(c) in more detail.

A data area in the uppermost row in FIG. 14 stores a plurality of pairs of modified time stamps and application packets, as indicated in the second row in FIG. 14. Each application packet stores a plurality of sets of application packet headers and payloads, as shown in the third row in FIG. 14. Upon collecting data from a plurality of payloads, data sets of I-, B-, and P-pictures are formed, as exemplified in the fourth row in FIG. 14. A data part of I-picture includes a picture header, compression information, and the like, as shown in the fifth row in FIG. 15. Furthermore, the picture header includes a header ID, picture ID, and the like, as shown in the lowermost row in FIG. 14.

Note that presentation time stamp PTS (not shown in FIG. 14) indicates the packet sending timing from memory 426 in FIG. 9 to video decoder 428. When the value of system time counter (system clock) STC 424 matches the PTS value or assumes a predetermined large value, I-picture information in FIG. 14 is sent to video decoder 428, which begins to decode the received I-picture information at the timing of decode time stamp DTS (not shown).

When any synchronization error has occurred between, e.g., optical disc device 415 and STB device 416 in FIG. 9, the data transfer amount sent from memory 426 to video decoder 428 based on PTS does not match (unmatches) the data amount sent from optical disc device 415 to memory 426. To combat such shortcoming, the apparatus shown in FIG. 9 has the following functions.

For example, every time a specific number of application packets (e.g., 10,000 or 100,000 packets) are sent/received, the optical disc device and STB device respectively record the send/reception times in temporary storage 411 and work memory 407. In this manner, both the devices can create time information tables every time a specific number of application packets are sent/received. The STB device transfers the time information table to the optical disc device at appropriate time intervals (e.g., 10- or 30-min intervals: this time interval may be arbitrarily corrected). The optical disc device compares the two time information tables, and detects time difference information. As a result, the time difference (synchronization error) generated between the two devices can be detected every specific number of application packets. The data playback speed of optical disc device 415 or the data transfer timing can be adjusted in correspondence with this synchronization error amount.

As an example of means for controlling the data transfer timing, a method of filtering the aforementioned modified time-stamp by a conversion table (not shown) before actual use is available. As time adjustment means, various methods are available in correspondence with the amounts to be adjusted. This adjustment means is effective when another disc device recorded data on information storage medium 201. If the reference clocks of a device that plays back data in practice have any frequency difference from those of a device that recorded data in practice, the value of the playback modified time stamp is often different from that the playback device expected.

The effects in the embodiment of the present invention mentioned above are summarized as follows.

Since an optical application header type (long or short) is selected in correspondence with the contents (type) of stream data to be recorded on an information storage medium, no unnecessary information need be recorded as application header information. As a result, the recording efficiency of information to be recorded on the information storage medium can be improved, and an effective recording capacity of the information storage medium can be increased in practice.

Time stamps are re-appended to stream data transferred by, e.g., IEEE1394 or the like on the basis of the internal reference clock of the streamer, and time information at the head position of each stream pack can be recorded in that stream pack as a system clock (SCR) on the basis of the reference clock. Therefore, the following effects are obtained.

(a) When stream data are played back while being skipped, the reference clock of the streamer is reset in correspondence with the system clock (SCR) recorded in each stream pack, and each application packet can be output in synchronism with the timing of time stamp information with reference to the reset reference clock in the streamer. In this way, by resetting the reference clock using the system clock (SCR) recorded in each stream pack, even when stream data stored at discrete positions on the information storage medium are randomly and intermittently played back, the stable output timings of application packets can be held.

(b) When stream data recorded on the information storage medium is searched using the time stamp value, coarse access can be made by playing back only the system clock (SCR) value recorded in each stream pack (using it as an index) without playing back time stamps.

(c) By comparing the system clock (SCR) value recorded in each stream pack and the time stamp value upon playback, it can be checked in real time if stream data, playback of which is underway is data to be played back.

Synchronization between the optical disc device and STB device can be managed to transfer an appropriate amount of data from the optical disc device to the STB device.

Figure 15:
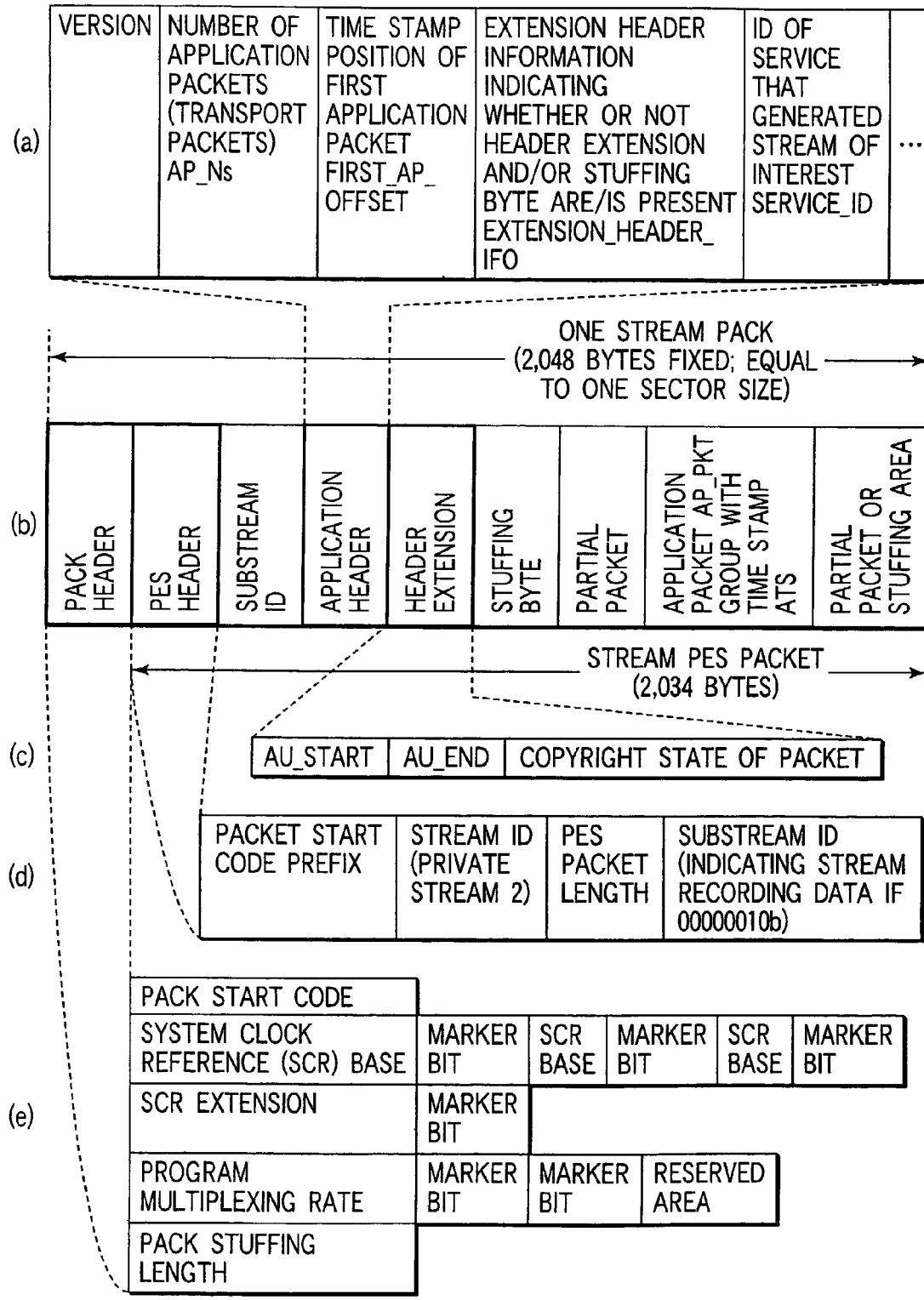
FIG. 15 is a view for explaining the data structure of a stream pack.

FIG. 15 is a view for explaining the data structure of a stream pack. Each stream pack has a data structure shown in FIG. 15(*b*). One stream pack is formed by a 14-byte pack header, 6-byte PES header, 1-byte substream ID, 9-byte application header, application header extension (option) which is used as needed, stuffing byte (option) which is used as needed, and application packet group including one or more application packets each appended with application time stamp ATS.

The pack header in FIG. 15(*b*) contains pack start code information, system clock reference (SCR) base information, SCR extension information, program multiplexing rate information, pack stuffing length information, and the like, as shown in FIG. 15(*e*). The SCR base consists of 32 bits, and its 32nd bit is zero. As the program multiplexing rate, for example, 10.08 Mbps are used.

The PES header in FIG. 15(*b*) includes packet start code prefix information, stream ID (private stream 2) information, and PES packet length information, as shown in FIG. 15(*d*). The substream ID has contents for specifying stream recording data, as shown in FIG. 15(*d*). More specifically, substream ID="00000010b" indicates that data stored in that stream pack is stream recording data. When this stream ID is "10111110b", it indicates that the stream pack of interest is used as a padding packet.

The application header in FIG. 15(*b*) includes version information, the number AP_Ns of application packets, time stamp position FIRST_AP_OFFSET of the first application packet, extension header information EXTENSION_HEADER_IFO, service ID, and the like, as shown in FIG. 15(*a*).

Note that the version describes the version number of the application header format.

AP_Ns in the application header describes the number of application packets that start within the stream pack of interest. If the stream pack of interest stores the first byte of ATS, it is determined that an application packet starts in this stream pack.

FIRST_AP_OFFSET describes the time stamp position of the first application packet that starts within the stream packet of interest as a relative value (unit: byte) from the first byte in this stream packet. If no application packet starts within the stream packet, FIRST_AP_OFFSET describes "0".

EXTENSION_HEADER_IFO describes whether or not an application header extension and/or stuffing byte are/is present within the stream packet of interest. If the contents of EXTENSION_HEADER_IFO are 00b, it indicates that neither the application header extension nor stuffing byte are present after the application header. If the contents of EXTENSION_HEADER_IFO are 10b, it indicates that the application header extension is present after the application header, but no stuffing byte is present. If the contents of EXTENSION_HEADER_IFO are 11b, it indicates that the application header extension is present after the application header, and the stuffing byte is also present after the application header extension. The contents of EXTENSION HEADER_IFO are inhibited from assuming 01b.

The stuffing byte (option) before the application packet area is activated by "EXTENSION_HEADER_IFO=11b". In this manner, "packing paradox" can be prevented when the number of bytes in the application header extension is contradictory to the number of application packets that can be stored in the application packet area.

SERVICE_ID describes the ID of a service that generates the stream. If this service is unknown, SERVICE_ID describes 0×0000.

The stuffing byte and application packet group in FIG. 15(*b*) form an application packet area. The head portion of this application packet area can include a part of an application packet (partial packet) extending from a preceding packet as needed. After this packet, a plurality of pairs of application time stamps ATS and application packets can be sequentially recorded. At the end of the application packet area, a part of an application packet extending to a succeeding stream packet (partial packet) or a stuffing area with the reserved number of bytes can be included as needed.

In other words, a partial application packet can be present at the start position of the application packet area, and a partial application packet or a stuffing area with a reserved number of bytes can be present at the end position of the application packet area.

The application time stamp (ATS) allocated before each application packet consists of 32 bits (4 bytes). This ATS can be divided into two fields, i.e., a basic field and extended field. The basic field is called a 90-kHz unit value, and the extended field indicates a less significant value measured at 27 MHz.

In FIG. 15(*b*), the application header extension can be used to store information which can differ between application packets. Such information is not always required for all applications. Therefore, the data field of the application header is defined to be able to describe the presence of the application header extension as an option in the stream data area (in EXTENSION_HEADER_IFO mentioned above).

Upon recording a stream, the first byte of application time stamp ATS of the first application packet must be aligned to the start position of the application packet area in the first stream packet at the beginning of stream object SOB.

On the other hand, as for the subsequent stream packet in the SOB, an application packet may be segmented (split) at the boundary of neighboring stream packets. Partial packets shown in FIG. 15(b) indicate application packets formed by this segmentation (split).

The byte offset of the first application time stamp that starts within the stream packet and the number of application packets which start within that stream packet are described in the application header. With this format, stuffing before the first application time stamp and after the last application packet is automatically done in a given stream packet. That is, the automatic mechanism allows "the application to make stuffing by itself". With this automatic stuffing, a stream packet can always have a required length.

The application header extension (option) consists of a list of entries. The list includes one entry having a 1-byte length corresponding to each application packet that starts within the stream packet of interest. The bytes of these entries can be used to store information which may differ in units of application packets.

Note that the 1-byte application header extension (option) can describe 1-bit AU_START, 1-bit AU_END, and 2-bit COPYRIGHT, as shown in FIG. 15(c). When AU_START is set at "1", it indicates that a related application packet includes a random access entry point (start of a random access unit) within the stream. When AU_END is set at "1", it indicates that a related application packet is the last packet of the random access unit. COPYRIGHT describes the state of copyright of a related application packet.

The packet structure shown in FIG. 15 can be applied to sectors other than the last sector of the stream object (SOB) of interest, but cannot always be applied to the last sector. To the last sector which does not undergo any information recording of SOB, a stuffing packet, an application packet area of which is stuffed with one ATS and zero bytes (head stuffing packet) or a stuffing packet, an application packet area of which is stuffed with zero bytes (succeeding stuffing packet) is applied.

Features of the data structure in FIG. 15 can be summarized as follows. A set of one or more stream objects (SOB) that represent playback data for a recorded bitstream form stream data. Each stream object (SOB) is made up of one or more stream packs (S_PCK). Each stream pack (S_PCK) is made up of a pack header and a stream packet (S_PKT). The pack header includes predetermined time information (SCR). The stream packet includes one or more application packets (AP_PKT) appended with predetermined time stamps (ATS). An application packet (AP_PKT) input (to the streamer) during recording of the stream object (SOB) is time-stamped by a local reference clock (440 in FIG. 9) (inside the streamer) corresponding to the predetermined time information (SCR) (modified time stamp in FIG. 14; ATS in FIG. 15), and the time stamp information is recorded in the stream pack (S_PCK).

The stream packet has an application header, which includes position information (FIRST_AP_OFFSET) of the first time stamp recorded in that stream packet.

Upon recording the stream object (SOB) on an information medium (201), an incoming application packet (AP_PKT) (to the streamer) is time-stamped by the local reference clock (440 in FIG. 9) (inside the streamer) corresponding to the predetermined time information (SCR) (modified time stamp in S4 in FIG. 10; time stamp in ST106, ST212, and ST312 in FIGS. 21 to 23), and the time stamp information is recorded in the stream pack (S_PCK).

Figure 16:
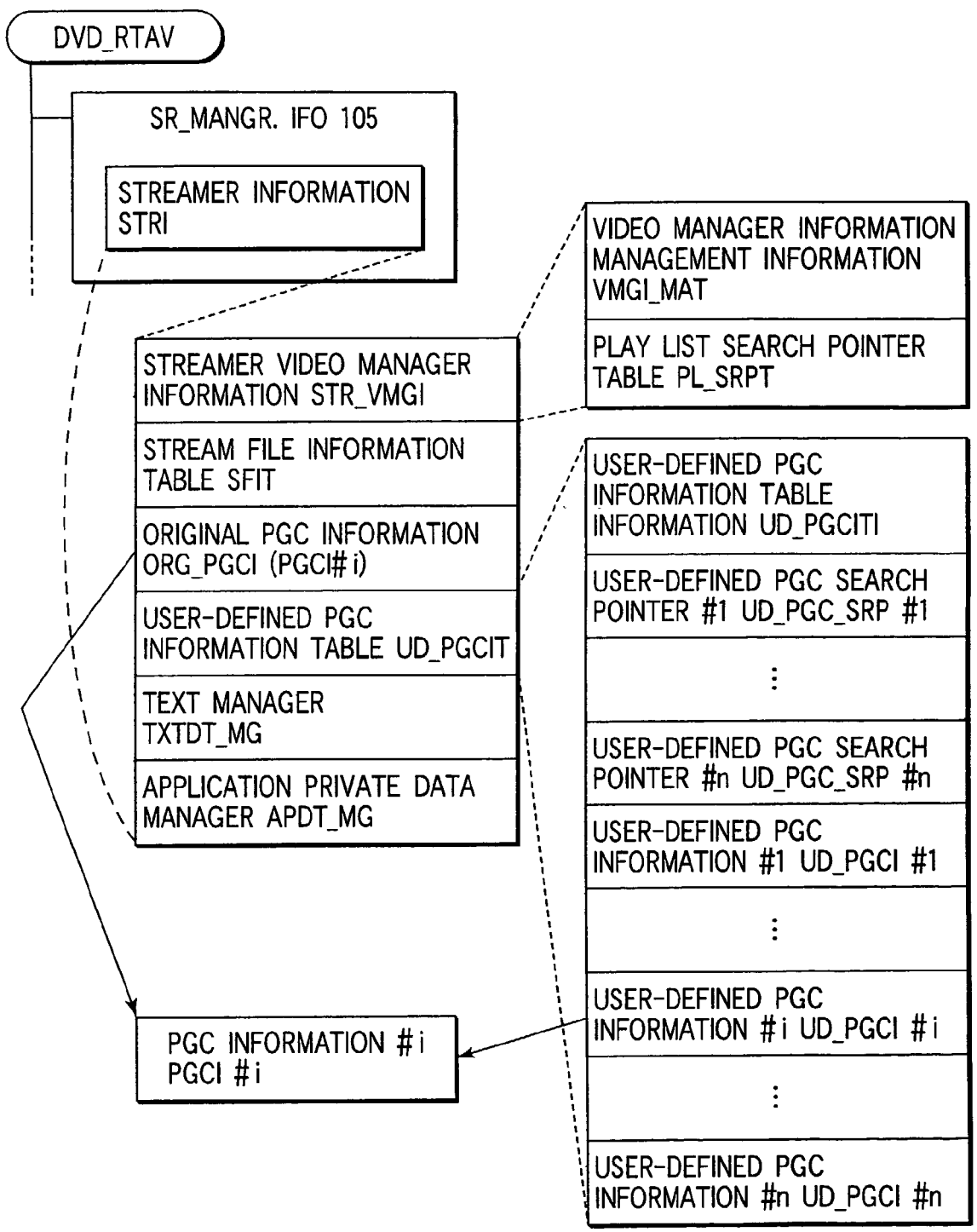
FIG. 16 is a view for explaining the internal data structure of management information (corresponding to STREAM.IFO in FIG. 2 or 3) of the streamer.

FIG. 16 is a view for explaining the internal data structure of management information (STREAM.IFO or SR_MANGR.IFO in FIG. 2 or 3) of the streamer. STREAM.IFO (SR_MANGR.IFO) 105 as management information (navigation data) shown in FIG. 2 or 3(e) includes streamer information STRI, as shown in FIG. 16.

This streamer information STRI is comprised of streamer video manager information STR_VMGI, stream file information table SFIT, original PGC information ORG_PGCI (more generally, PGC information PGCI#i), user-defined PGC information table UD_PGCIT, text data manager TXT-DT_MG, and application private data manager APDT_MG, as shown in FIG. 3(f) or 16.

Streamer video manager STR_VMGI includes video manager information management information VTSI_MAT that describes management information which pertains to STRI and STR_VMGI, and the like, and a play list search pointer table (PL_SRPT) that describes search pointers used to search for a play list in the stream, as shown in FIG. 16. Note that the play list is a list of portions of a program. With this play list, the user can define an arbitrary playback sequence (for the contents of a program). Stream file information table SFIT includes all navigation data that directly pertain to the streamer operation. Details of stream file information table SFIT will be explained later with reference to FIG. 18.

Original PGC information ORG_PGCI is a portion that describes information which pertains to an original PGC (ORG_PGC). ORG_PGC indicates navigation data which describes a program set. ORG_PGC is a chain of programs, and includes stream data recorded in a "*.SRO" file (SR_TRANS.SRO 106 in FIG. 2).

Note that the program set indicates the entire recorded contents (all programs) of information storage medium 201. Upon playing back the program set, the same playback order as the recording order of programs is used except for a case wherein an arbitrary program has been edited, and the playback order of original recording has been changed. This program set corresponds to a data structure called an original PGC (ORG_PGC).

Also, a program is a logical unit of recorded contents, which is recognized by the user or is defined by the user. A program in the program set is made up of one or more original cells. The program is defined within only the original PGC. Furthermore, a cell is a data structure indicating a portion of a program. A cell in the original PGC is called an "original cell", and a cell in a user-defined PGC (to be described later) is called a "user-defined cell". Each program in the program set consists of at least one original cell. A portion of a program in each play list consists of at least one user-defined cell.

On the other hand, only a stream cell (SC) is defined in the streamer. Each stream cell looks up a portion of the recorded bitstream. In an embodiment of the present invention, a "cell" means a "stream cell" unless otherwise specified.

Note that a program chain (PGC) is a generic unit. In an original PGC, PGC indicates a chain of programs corresponding to a program set. On the other hand, in a user-defined PGC, PGC indicates a chain of portions of programs corresponding to a play list. A user-defined PGC indicating a chain of portions of programs includes navigation data alone. A portion of each program looks up stream data belonging to the original PGC.

User-defined PGC information table UD_PGCIT in FIG. 16 can include user-defined PGC information table information UD_PGCITI, one or more user-defined PGC search pointers UD_PGC_SRP#n, and one or more pieces of user-defined PGC information UD_PGCI#n. User-defined PGC information table information UD_PGCITI includes UD_PGC_SRP_Ns indicating the number of user-defined PGC search pointers UD_PGC_SRP, and UD_PGCIT_EA indicating the end address of user-defined PGC information table UD_PGCIT (not shown).

The number of "UD_PGC_SRP"s indicated by UD_PGC_SRP_Ns is the same as the number of pieces of user-defined PGC information (UD_PGCI), and is also the same as the number of user-defined PGCs (UD_PGC). The maximum value of UD_PGC_SRP_Ns is "99". UD_PGCIT_EA describes the end address of UD_PGCIT of interest by the relative number of bytes (F_RBN) from the first byte of that UD_PGCIT. Note that F_RBN indicates the relative number of bytes from the first byte of the defined field, and starts from zero.

PGCI#i that generally expresses original PGC information ORG_PGCI or user-defined PGC information UD_PGCI in user-defined PGC information table UD_PGCIT will be described later with reference to FIG. 17.

Text data manager TXTDT_MG in FIG. 16 is supplementary text information. This TXTDT_MG can be stored in the play list and program together with primary text information PRM_TXTI shown in FIG. 17.

Application private data manager APDT_M in FIG. 16 can include application private data manager general information APDT_GI, one or more APDT search pointers APDT_SRP#n, and one or more APDT areas APADTA#n (not shown). Note that application private data APDT is a conceptual area that allows an application device connected to the streamer to store arbitrary non-real time information (more desired information in addition to real-time stream data).

Figure 17:
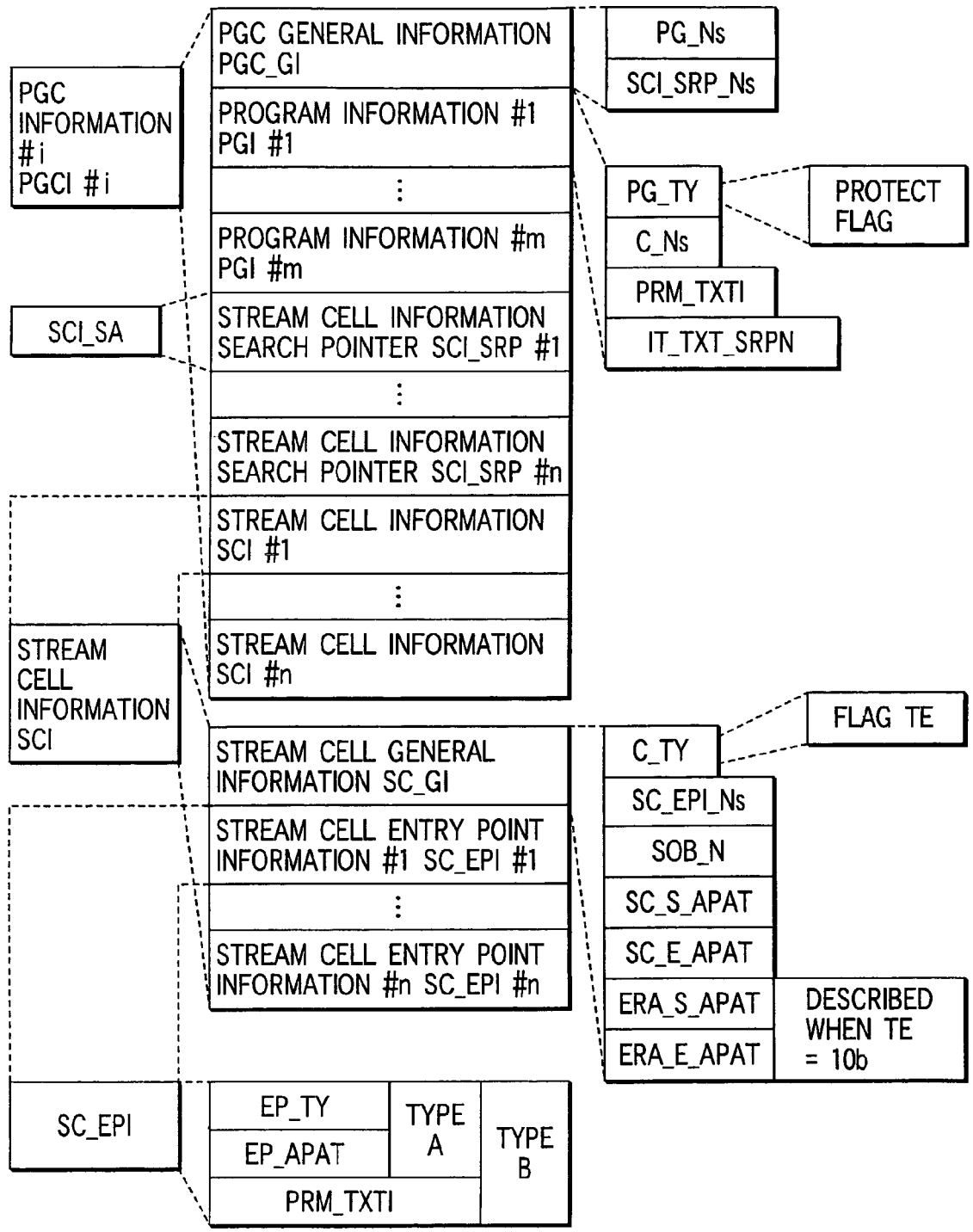
FIG. 17 is a view for explaining the internal data structure of PGC information (ORG_PGCI/UD_PGCIT in FIG. 3 or PGCI#i in FIG. 16)

FIG. 17 is a view for explaining the internal data structure of PGC Information (ORG_PGCI/UD_PGCIT in FIG. 3 or PGCI#i in FIG. 16). PGC information PGCI#i in FIG. 17 generally expresses original PGC information ORG_PGCI or user-defined PGC information UD_PGCI in user-defined PGC information table UD_PGCIT in FIG. 16.

As shown in FIG. 17, PGC information PGCI#i is made up of PGC general information PGC_GI, one or more pieces of program information PGI#m, one or more stream cell information search pointers SCI_SRP#n, and one or more pieces of stream cell information SCI#n. PGC general information PGC_GI includes the number PG_Ns of programs, and the number SCI_SRP_Ns of stream cell information search pointers SCI_SRP. Each program information PGI (e.g., PGI#1) includes program type PG_TY, the number C_Ns of cells in the program of interest, primary text information PRM_TXTI of the program of interest, and search pointer number IT_TXT_SRPN of item text.

Note that program type PG_TY includes information indicating the state of the program of interest. Especially, program type PG_TY includes a flag indicating if that program is protected from an erase error, i.e., a protect flag. When this protect flag is "0b", the program of interest is not protected; when it is "1b", the program is protected.

The number C_Ns of cells indicates the number of cells in the program of interest. In all the programs and cells in a PGC, cells (tacitly) append themselves to each program in their ascending order. For example, if program #1 in a given PGC has C_Ns=1, and program #2 has C_Ns=2, first stream cell information SCI of that PGC is appended to program #1, and the second SCI and third SCI are appended to program #2.

Primary text information PRM_TXTI describes text information having a single common character set (ISO/IEC646: 1983 (ASCII code)) to allow use of information storage medium (DVD-RAM disc) 201 anywhere in the world.

Item text search pointer number IT_TXT_SRPN describes a search pointer number corresponding to item text (text data corresponding to the program of interest) IT_TXT. If the program of interest has no item text, IT_TXT_SRPN is set at "00000h".

Each stream cell information search pointer SCI_SRP (e.g., SCI_SRP#1) includes SCI_SA indicating the start address of corresponding stream cell information SCI. This SCI_SA is described as the relative number of bytes (F_RBN) from the first byte of PGCI.

Each stream cell information SCI (e.g., SCI#1) is made up of stream cell general information SC_GI and one or more pieces of stream cell entry point information SC_EPI#n. Stream cell general information SC_GI includes cell type C_TY including flag TE indicating a temporary erase (TE) state, the number SC_EPI_Ns of pieces of entry point information of a stream cell, stream object number SOB_N, stream cell start APAT (SC_S_APAT), stream cell end APAT (SC_E_APAT), erase start APAT (ERA_S_APAT) indicating start APAT of a temporary erase cell if that cell is in the temporary erase state (TE=10b), and erase end APAT (ERA_E_APAT) indicating end APAT of a temporary erase cell if that cell is in the temporary erase state (TE=10b).

Cell type C_TY describes the type and temporary erase state of the stream cell of interest. More specifically, cell type C_TY1="010b" is described in the type of all stream cells (with this C_TY1="010b", a stream cell can be distinguished from other cells).

On the other hand, if flag TE is "00b", it indicates that the cell of interest is in a normal state; if flag TE is "01b" or "10b", that cell is in a temporary erase state. Flag TE="01b" indicates that the cell of interest (cell in the temporary erase state) starts from a position after the first application packet that starts within a SOBU, and comes to an end at a position before the last application packet in that SOBU. On the other hand, flag TE="10b" indicates that the cell of interest (cell in the temporary erase state) includes at least one SOBU boundary (the first or last application packets starts within that SOBU).

Note that a protect flag of a program and TE flag of a cell in that program cannot be set at the same time. Therefore, (a) none of cells in a program in the protect state can be set in the temporary erase state; and (b) a program including one or more cells in the temporary erase state cannot be set in the protect state.

The number SC_EPI_Ns of pieces of entry point information of a stream cell describes the number of pieces of stream cell entry point information included in stream cell information SCI of interest.

Each stream cell entry point information SC_EPI (e.g., SC_EPI#1) in FIG. 17 includes two types (types A and B). SC_EPI of type A includes entry point type EP_TY and entry point application packet arrival time EP_APAT. Type A is set by entry point type EP TY1="00b". SC_EPI of type B includes primary text information PRM_TXTI in addition to EP_TY and EP_APAT of type A. Type B is indicated by entry point type EP_TY1="01b".

As a tool for skipping a portion of the recorded contents in an arbitrary stream cell, an entry point can be used. All entry points can be specified by application packet arrival times (APAT). This APAT can specify the data output start position.

Stream object number SOB_N describes the number of an SOB that the cell of interest looks up. Stream cell start APAT (SC_S_APAT) describes start APAT of the cell of interest. Stream cell end APAT (SC_E_APAT) describes end APAT of the cell of interest.

Erase start APAT (ERA_S_APAT) describes the arrival time (APAT) of the first application packet that starts within the first SOBU, the head position of which is included in a given temporary erase cell (TE field of its C_TY is "10b") including at least one SOBU boundary, in that temporary erase cell. Erase end APAT (ERA_E_APAT) describes the arrival time (APAT) of the first application packet that starts within an SOBU including an application packet which immediately follows a temporary erase cell (TE field of its C_TY is "10b") including at least one SOBU boundary, in that temporary erase cell.

Features of the data structure in FIG. 17 can be summarized as follows. That is, the stream object (SOB) contains information of a stream cell (SC). Arrival time information (SC_S_APAT/SC_E_APAT) of the application packet (AP_PKT) with respect to the stream cell is interlocked with the value of the time stamp information recorded in the stream pack (S_PCK). The time stamp information value is set in correspondence with the time information (SCR) in the stream pack (S_PCK).

Figure 18:
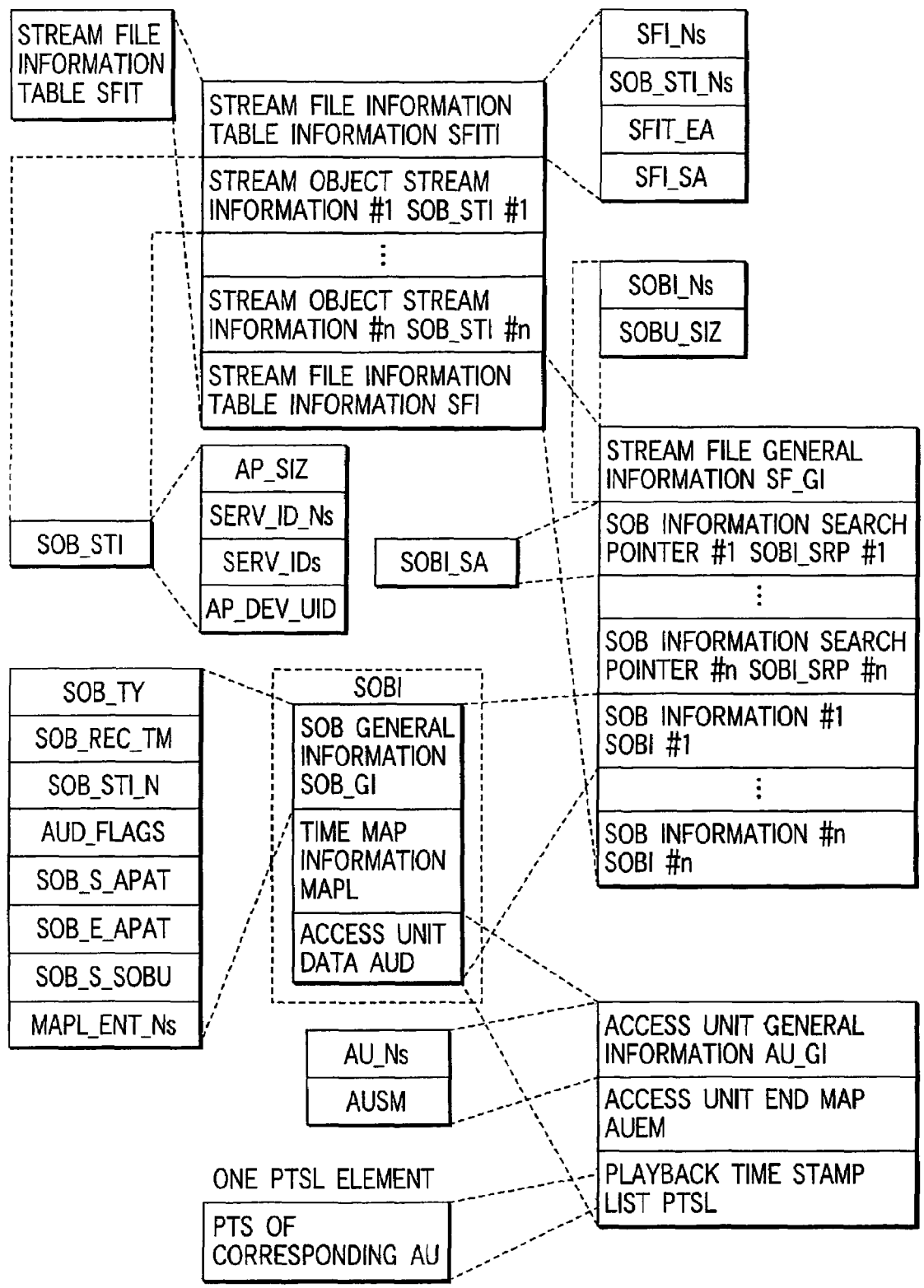
FIG. 18 is a view for explaining the internal data structure of a stream file information table (SFIT)

FIG. 18 is a view for explaining the internal data structure of the stream file information table (SFIT). As shown in FIG. 18, stream file information table SFIT is made up of stream file information table information SFITI, one or more pieces of stream object stream information SOB_STI#n, and stream file information SFI.

Stream file information table information SFITI consists of the number SFI_Ns of pieces of stream file information on information storage medium (DVD-RAM disc) 201, the number SOB_STI_Ns of pieces of stream object stream information that follow SFITI, end address SFIT_EA of SFIT, and start address SFI_SA of SFI. SFIT_EA describes the end address of SFIT by the relative number of bytes (F_RBN) from the first byte of SFIT. SFI_SA describes the start address of SFI by the relative number of bytes (F_RBN) from the first byte of SFIT.

Each stream object stream information SOB_STI includes three different parameters. Each parameter can assume a value unique to individual bitstream recording. However, these parameter sets can have equal values in most bitstream recording. Therefore, SOB_STI is stored in a table independently from the table of stream object information (SOBI), and some stream objects (SOB) are allowed to share identical SOB_STI (i.e., point to identical SOB_STI). Hence, the number of pieces of SOB_STI is generally smaller than the number of SOBs.

Each stream object stream information SOB_STI (e.g., SOB_STI#1) in FIG. 18 includes application packet size AP_SIZ, the number SERV_ID_Ns of service IDs, service ID (SERV_IDs), and application packet device unique ID (AP_DEV_UID). AP_SIZ describes the application packet size_by the byte length of a packet in a bitstream transferred from an application device to the streamer.

In the DVD streamer, the application packet size is fixed in each bitstream recording. For this reason, if the application packet size changes in each recording free from any interrupt, the current stream object (current SOB) comes to an end there, and a new stream object (new SOB) starts with new AP_SIZ. In this case, the current and new SOBs belong to an identical program in original PGC information (ORG_PGCI).

SERV_ID_Ns describes the number of service IDs included in the subsequent parameter. SERV_IDs describes a list of service IDs in an arbitrary order. AP_DEV_UID describes a unique device ID unique to an application device that supplies the recorded bitstream.

As shown in FIG. 18, stream file information SFI is comprised of stream file general information SF_GI, one or more stream object information (SOB information) search pointers (SOBI_SRP) #n, and one or more pieces of SOB information (SOBI) #n. Stream file general information SF_GI includes the number SOBI_Ns of pieces of SOBI, and sector size SOBU_SIZ per SOBU.

SOBU_SIZ describes the SOBU size using the number of sectors, and this size is fixed at 32 (32 sectors=64 kbytes). This means that the first entry is associated with an application packet included in the first 32 sectors of an SOB. Likewise, the second entry is associated with an application packet included in the next 32 sectors. The same applies to the third and subsequent entries.

Each SOB information search pointer (e.g., SOBI_SRP#1) includes start address SOBI_SA of SOBI. This SOBI_SA describes the start address of the associated SOBI using the relative number of bytes (F_RBN) from the first byte of stream file information SFI.

Each SOB information (e.g., SOBI#1) is made up of stream object general information SOB_GI, time map information MAPL, and access unit data AUD (option).

Stream object general information SOB_GI includes stream object type SOB_TY, stream object recording time SOB_REC_TM, stream object stream information number SOB_STI_N, access unit data flag AUD_FLAGS, stream object start application packet arrival time SOB_S_APAT, stream object end application packet arrival time SOB_E_APAT, start stream object unit SOB S_SOBU of the stream object of interest, and the number MAPL_ENT_Ns of entries in time map information.

Stream object type SOB_TY is a field that describes bits indicating the temporary erase state (TE state) and/or bits of the copy generation management system. Stream object recording time SOB_REC_TM describes the recording time of the associated stream object (SOB). Stream object stream information number SOB_STI_N describes an index of valid SOB_STI for the stream object of interest.

Access unit data flag AUD_FLAGS describes whether or not access unit data (AUD) is present for the stream object of interest, and the type of access unit data if it is present. If access unit data (AUD) is present, AUD_FLAGS describes some properties of AUD. The access unit data (AUD) itself consists of access unit general information AU_GI, access unit end map AUEM, and playback time stamp list PTSL, as shown in FIG. 18.

Access unit general information AU_GI includes AU_Ns indicating the number of access units described in correspondence with the SOB of interest, and access unit start map AUSM indicating an SOBU that belongs to the SOB of interest and includes an access unit. Access unit end map AUEM is a bit array having the same length as that of AUSM (if it is present), and indicates an SOBU that includes the terminal end of a bitstream segment appended to the access unit of the SOB of interest. Playback time stamp list PTSL is a list of playback time stamps of all access units that belong to the SOB of interest. One PTSL element included in this list includes a playback time stamp (PTS) of the corresponding access unit.

Note that the access unit (AU) indicates an arbitrary single, continuous portion of the recorded bitstream, and is suitable for individual playback. For example, in an audio/video bitstream, an access unit corresponds to I-picture of MPEG.

The contents of SOB_GI will be explained again. AUD_FLAGS includes flag RTAU_FLG, flag AUD_FLG, flag AUEM_FLG, and flag PTSL_FLG. When flag RTAU_FLG is 0b, it indicates that no access unit flag is present in real-time data of the SOB of interest. When flag RTAU_FLG is 1b, it indicates that AU flags (AU_START, AU_END) described in the application header extension shown in FIG. 15(b) can be present in real-time data of the SOB of interest. This state is also allowed when AUD_FLG (to be described below) is 0b.

When flag AUD_FLG is 0b, it indicates that no access unit data (AUD) is present for the SOB of interest. When flag AUD_FLG is 1b, it indicates that access unit data (AUD) can be present for the SOB of interest. When flag AUEM_FLG is 0b, it indicates that no AUEM is present in the SOB of interest. When flag AUEM_FLG is 1b, it indicates that AUEM is present in the SOB of interest. When flag PTSL_FLG is 0b, it indicates that no PTSL is present in the SOB of interest. When flag PTSL_FLG is 1b, it indicates that PTSL is present in the SOB of interest.

SOB_S_APAT included in SOB_GI in FIG. 18 desribes_the start application packet arrival time of a stream object. That is, SOB_S_APAT indicates the arrival time of the first application packet that belongs to the SOB of interest. This packet arrival time (PAT) is divided into two fields, i.e., a basic field and extended field. The basic field is called a 90-kHz unit value, and the extended field indicates a less significant value measured at 27 MHz. SOB_E_APAT describes the end application packet arrival time of a stream object. That is, SOB_E_APAT indicates the arrival time of the last application packet that belongs to the SOB of interest.

SOB_S_SOBU describes the start stream object unit of the stream object of interest. That is, SOB_S_SOBU indicates an SOBU including the start portion of the start application packet of the stream object. MAPL_ENT_Ns describes the number of entries in time map information (MAPL) that follows SOBI_GI. Time map information MAPL has contents corresponding to time map information 252 shown in FIG. 3(h).

One of relevancies between the contents of FIGS. 16 and 18 is summarized as follows. That is, streamer information (STRI) included in management information 105 in FIG. 2 or 3(e) contains stream file information table SFIT that manages stream object SOB which forms the contents of stream data. This SFIT includes stream object information SOBI that manages SOB. This SOBI includes access unit general information AU_GI including management information (access unit start map AUSM), and management information (PTSL). Note that the management information (ATS or AUSM) contains information used upon transferring stream data, and the management information (PTS or SC_S_APAT) contains information used when the stream data is displayed.

Features of the data structure in FIG. 18 can be summarized as follows. That is, arrival time information (SOB_S_APAT/SOB_E_APAT) of the application packet (AP_PKT) with respect to the stream object (SOB) is interlocked with the value of the time stamp information recorded in the stream pack (S_PCK). The time stamp information value is set in correspondence with the time information (SCR) in the stream pack (S_PCK).

Figure 19:
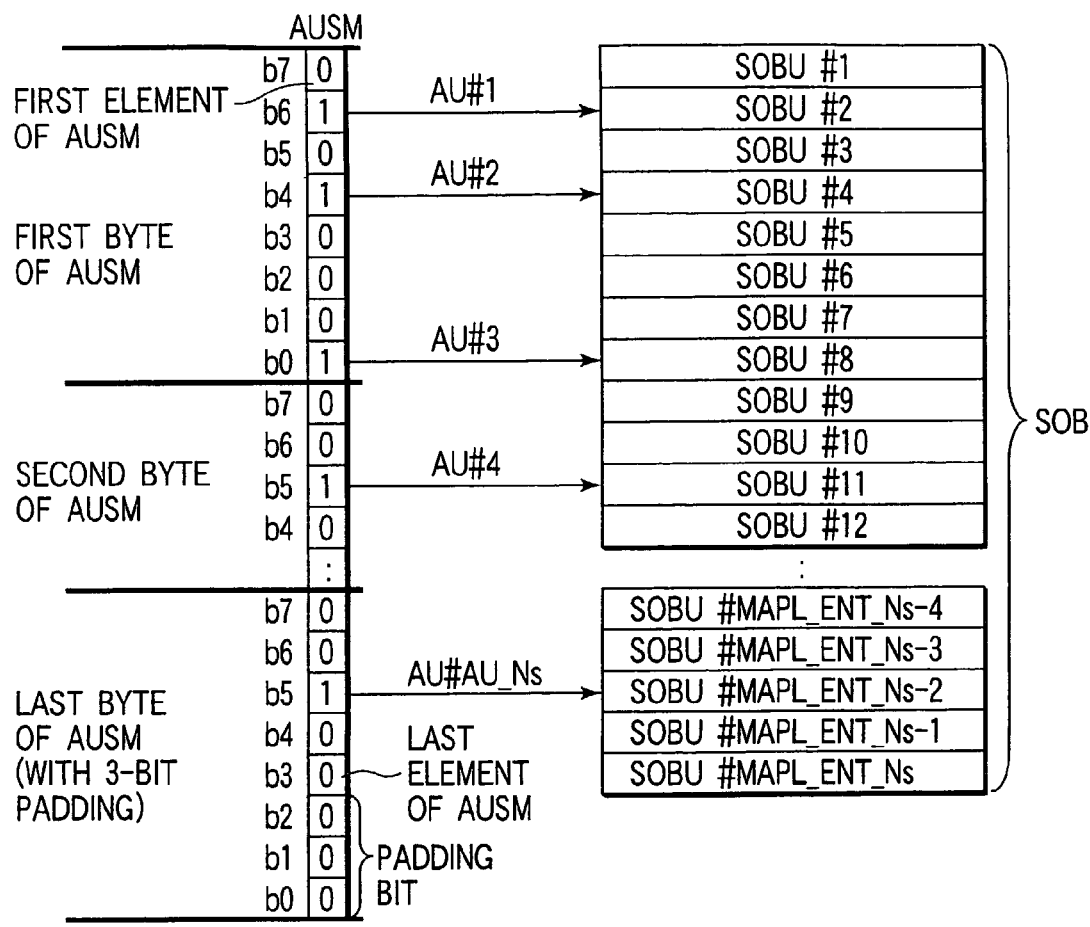
FIG. 19 is a view exemplifying the correspondence between an access unit start map (AUSM) and stream object unit (SOBU)

FIG. 19 is a view exemplifying the correspondence between the access unit start map (AUSM) and stream object unit (SOBU). As shown in FIG. 19, bit "1" of AUSM indicates that the access unit (AU) is included in the corresponding SOBU.

Assume that AUSM_pos(i) represents the i-th ($1 \leq i \leq AU\_Ns$) bit position where a bit is set in AUSM. Then, the position of access unit AU is as follows.

(1) If SOBU#i indicated by AUSM_pos(i) contains one or more start AUs (described using AU_START and AU_END marks in a stream (if available)), AUSM_pos(i) is assigned to the first AU that starts within SOBU#i. Note that SOBU#i is laid out in SOBUs described using AUSM_pos(i) and AUEM_pos(i) (if AUEM is available).

(2) AU comes to an end at the AU_END mark that appears first after this AU starts, and comes to an end in the last SOBU indicated by the assigned AUEM element (if AUEM is available).

In any access unit data, two or more accessible access units cannot be described per SOBU in an SOB.

Figure 20:
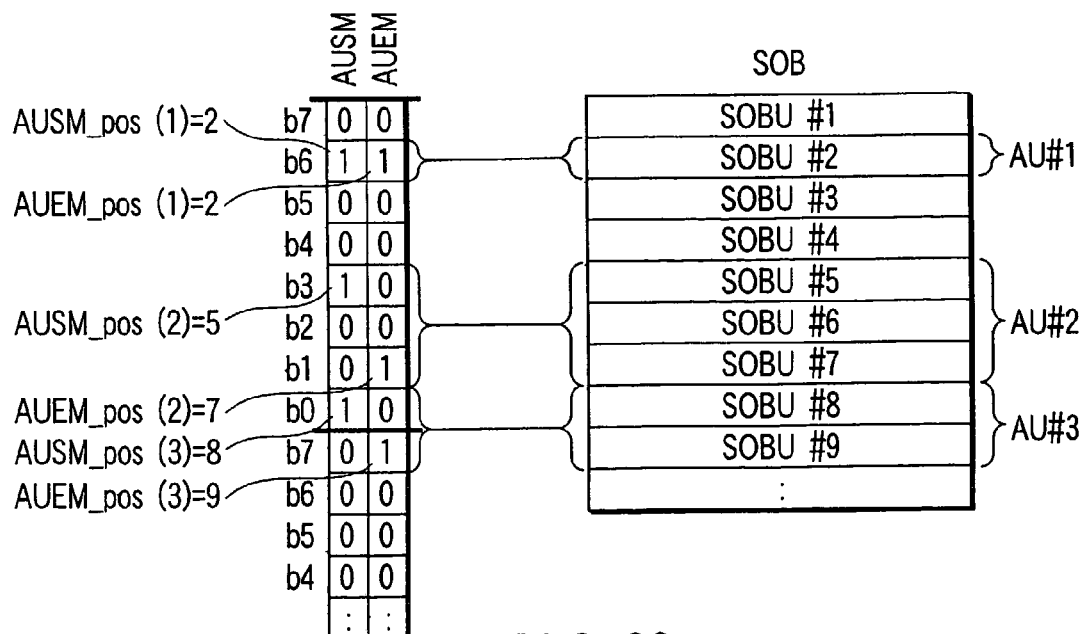
FIG. 20 is a view exemplifying the correspondence between an access unit start map (AUSM) and access unit end map (AUEM), and stream object unit (SOBU)

FIG. 20 is a view exemplifying the correspondence between the access unit start map (AUSM) and access unit end map (AUEM), and stream object unit (SOBU).

AUEM is a bit array having the same length as the AUSM (if available). The bits of AUEM indicate a SOBU that includes the end of a bitstream segment appended to the access unit of the SOB of interest. The number of bits set in AUEM matches that set in AUSM. That is, the set bits in AUSM have those set in AUEM in correspondence with each other.

Assume that AUSM_pos(i) represents the i-th ($1 \leq i \leq AU\_Ns$) bit position where a bit is set in AUSM, and AUEM_pos(i) the i-th ($1 \leq i \leq AU\_Ns$) bit position where a bit is set in AUEM. In this case, the following relations hold:

(1) $1 \leq AUSM\_pos(i) < AUEM\_pos(i) \leq MAPL\_ENT\_NS$;

(2) AUSM_pos(i+1)>AUEM_pos(i);

(3) If i==AU_Ns or AUSM_pos(i+1)>1 AUEM_pos(i), AU#i comes to an end in SOBU#[AUEM_pos(i)] ($1 \leq i \leq AU\_Ns$); and (4) If AUSM_pos(i+1)==1+AUEM_pos(i), AU#i comes to an end in SOBU#[AUEM pos(i)]. Or it comes to an end at the position of SOBU#[1+AUEM pos(i)]==SOBU#[AUSM_pos (i+1)]. That is, AU#i comes to an end at the beginning of AU#i+1 in SOBU ($1 \leq i \leq AU\_Ns$).

Figure 21:
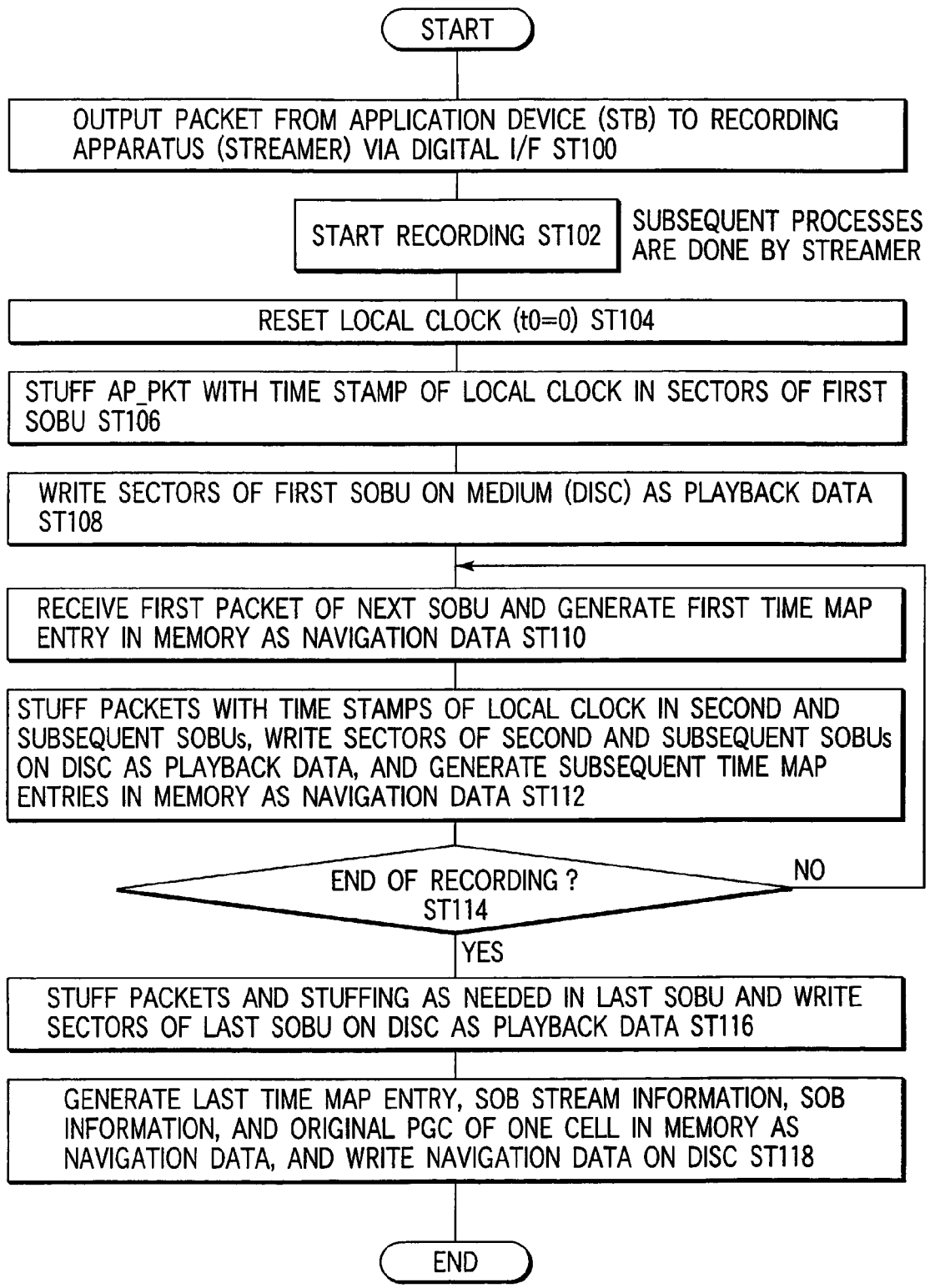
FIG. 21 is a flow chart for explaining the stream data recording sequence according to another embodiment of the present invention.

FIG. 21 is a flow chart for explaining the stream data recording sequence according to another embodiment of the present invention. An application device (STB or the like) outputs packets to a digital I/F (step ST100). The streamer then starts recording (step ST102). The following processes are done on the streamer side.

When recording starts, the streamer resets the local clock to t0=0 (step ST104). After that, the streamer stuffs application packets in sectors 0 to 31 of the first SOBU by assigning local clock values t0, t1, t2, . . . , thereto (step ST106). With the processes in steps ST104 to ST106 (corresponding to step S4 in FIG. 10 or step S12 in FIG. 13), the local reference clock inside the streamer becomes equal to arrival time APAT of the first application packet which starts within the first pack in SOB. Then, sectors 0 to 31 of the first SOBU are written on the information storage medium (disc) as presentation data (step ST108).

The streamer receives the first pack of the second SOBU, generates the first time map entry, and saves the generated time map entry in a memory as navigation data (step ST110). After that, the streamer stuffs packets in the second and subsequent SOBUs by assigning time stamps of the local clock thereto, and writes sectors of the second and subsequent SOBUs on the disc as playback data. The streamer then generates the next time map entry, and saves the generated time map entry in the memory as navigation data (step ST112). The processes in steps ST110 to ST112 (corresponding to step S9 in FIG. 10 or step S18 in FIG. 13) repeat themselves until recording ends.

If recording is complete (YES in step ST114), the streamer stuffs packets and stuffing bytes as needed in the last SOBU, and writes sectors of the last SOBU on the disc as playback data (step ST116). Finally, the streamer generates the last time map entry, SOBU stream information (SOB_STI), SOB information (SOBI), and an original PGC of one cell in the memory as navigation data, and writes the generated navigation data on the disc (step ST118).

With the process shown in FIG. 21, application packets (AP_PKT) with the time stamps of the local reference clock are recorded (ST106), and predetermined time map entries are generated as navigation data (ST110 to ST112).

Figure 22:
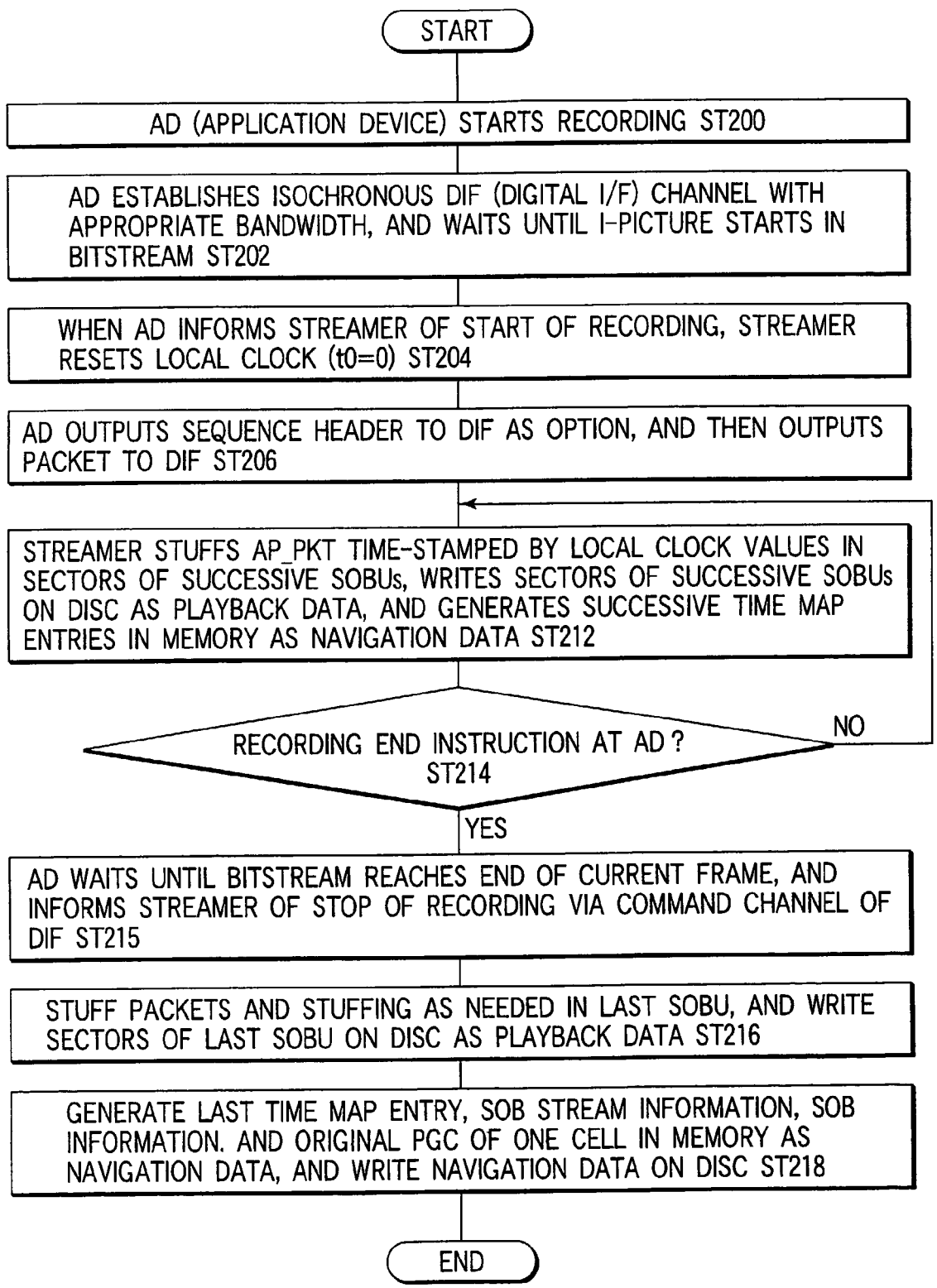
FIG. 22 is a flow chart for explaining the stream data recording sequence (digital video broadcast service) according to still another embodiment of the present invention.

FIG. 22 is a flow chart for explaining the stream data recording sequence (digital video broadcast service) according to still another embodiment of the present invention. An application device (AD) starts recording (step ST200). This recording starts when a record button of a device (not shown) has been pressed or when operation has been made on a user interface (not shown).

When recording starts, the application device establishes an isochronous digital I/F (DIF) channel with an appropriate bandwidth, and waits until I-picture starts in a bitstream (step ST202).

When the application device informs the streamer of start of recording, the streamer resets the local clock (t0=0) (step ST204). This process corresponds to step S12 in FIG. 13.

The application device outputs a sequence header to the digital I/F as an option, and then outputs packets to the digital I/F (step ST206). This process corresponds to steps S15 and S16 in FIG. 13.

Subsequently, the streamer stuffs application packets time-stamped by local clock values in sectors of successive SOBUs, writes the sectors of the successive SOBUs on a disc as playback data, and generates successive time map entries in a memory as navigation data (step ST212). The process in step ST212 continues until a recording end instruction is input at the application device.

If the recording end instruction is input at the application device (YES in step ST214), the application device waits until the bitstream reaches the end of the current frame, and informs the streamer of stop of recording via a command channel of the digital I/F (step ST215).

In response to this information, the streamer stuffs packets and stuffing bytes as needed in the last SOBU, and writes sectors of the last SOBU on the disc as playback data (step ST216).

Finally, the streamer generates the last time map entry, SOBU stream information (SOB_STI), SOB information (SOBI), and an original PGC of one cell in the memory as navigation data, and writes the generated navigation data on the disc (step ST218).

With the process in FIG. 22, the arrival time information (SOB_S_APAT/SOB_E_APAT) of each application packet for SOB is computed on the basis of the time stamp information of the local reference clock, and the computed arrival time information (SOB_S_APAT/SOB_E_APAT) is recorded as navigation data (step ST218).

Figure 23:
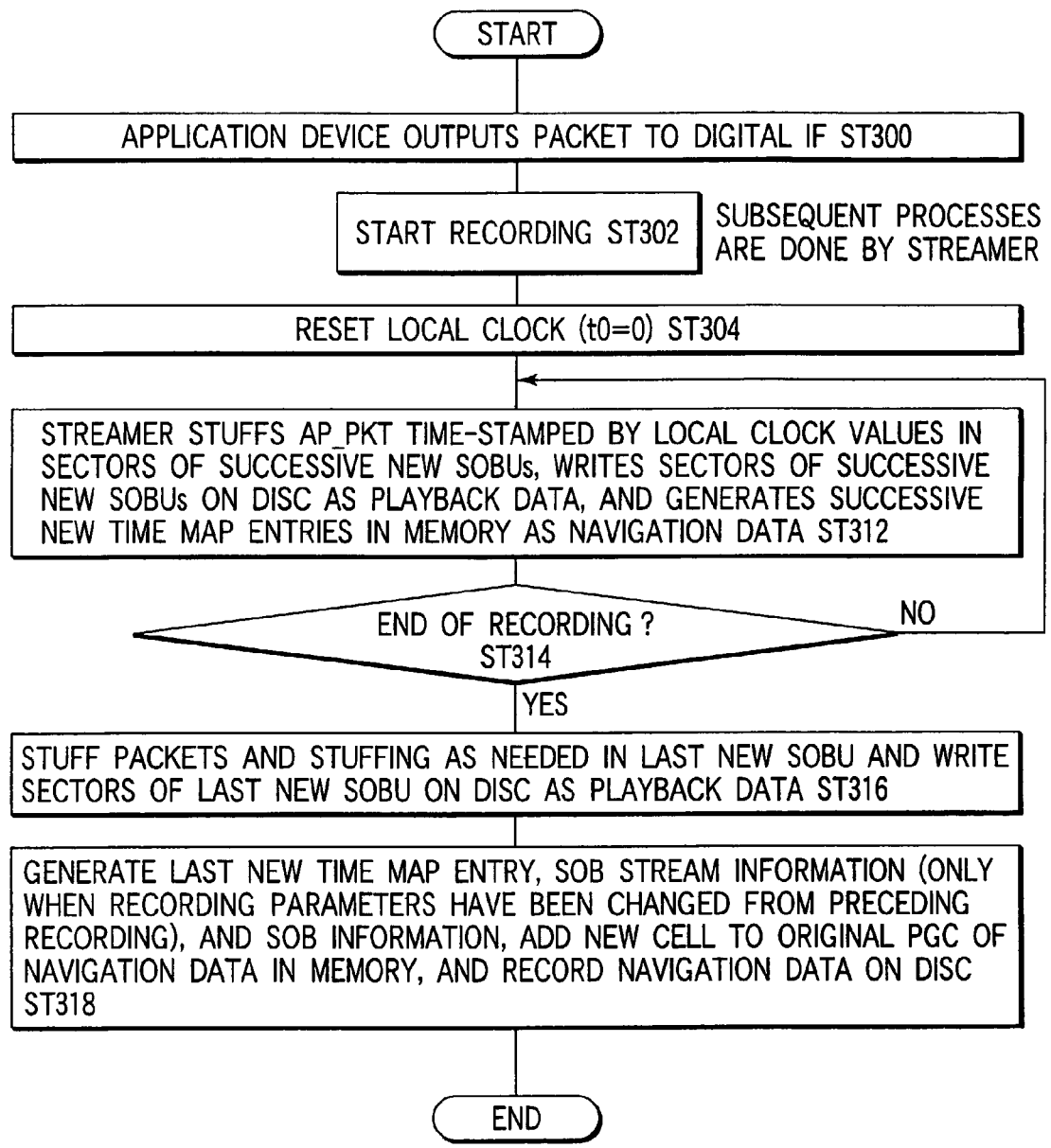
FIG. 23 is a flow chart for explaining the stream data recording sequence (when a new stream object is to be additionally written on the recorded medium) according to still another embodiment of the present invention.

FIG. 23 is a flow chart for explaining the stream data recording sequence (when a new stream object is additionally written on the recorded medium) according to still another embodiment of the present invention. An application device outputs packets to a digital I/F (step ST300). The streamer then starts recording (step ST302). The following processes are done on the streamer side.

When recording starts, the streamer resets the local clock to t0=0 (step ST304). This process corresponds to step S12 in FIG. 13.

After that, the streamer stuffs application packets time-stamped by local clock values in successive new SOBUs, writes sectors of the successive new SOBUs on a disc as playback data, and generates successive new time map entries in a memory as navigation data (step ST312). This process corresponds to step S12 in FIG. 13. The process in step ST312 continues until recording is complete.

Upon completion of recording (YES in step ST314), the streamer stuffs packets and stuffing bytes as needed in the last new SOBU, and writes sectors of the last new SOBU on the disc as playback data (step ST316).

Finally, the streamer generates the last new time map entry, SOB stream information (only when recording parameters have been changed from those in preceding recording), and SOB information, adds a new cell to the original PGC of the navigation data in the memory, and records the obtained navigation data on the disc (step T318). This process corresponds to step S18 in FIG. 13.

With the process in FIG. 23, the arrival time information (SC_S_APAT/SC_E_APAT) of each application packet for a stream cell is computed, and the computed arrival time information (SC_S_APAT/SC_E_APAT) is recorded as navigation data (step ST318).

As described above, according to the present invention, a data structure (recording format) on an information storage medium, which can play back stream data from the medium while holding the transfer timings between application packets upon reception in digital TV broadcast can be provided. Also, a method of recording stream data on the information storage medium using this data structure can be provided. Furthermore, a versatile data structure (recording format) which can record digital data transferred with a packet structure in addition to digital TV broadcast data can be provided. Moreover, a method of recording stream data on the information storage medium using this data structure can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or-scope-of the general inventive-concept as defined by the appended claims and their equivalents.

What is claimed is:

1. A machine readable information storage medium for access by a recording or reproducing apparatus, said medium comprising:
    a data area configured to store stream data as well as real-time video object data which is different from the stream data;
    a file information area configured to store file system information for managing files of the stream data and the real-time video object data; and
    a management area configured to store management information for managing the stream data being formed of one or more stream objects,
    wherein each stream object includes one or more packets each having a given time stamp, data files of the stream data and the real-time video object data to be managed by said file system information are stored under a single directory, when cells arranged in a reproduction order of the stream data are defined, the management information for managing the stream data includes start time information of the cell and end time information of the cell, and the start time information and the end time information are described using an arrival time of the packet.

2. A method of recording information on an information storage medium, said storage medium including,
    a data area configured to store stream data as well as real-time video object data which is different from the stream data;

a file information area configured to store file system information for managing files of the stream data and the real-time video object data; and a management area configured to store management information for managing the stream data being formed of one or more stream objects, wherein each stream object includes one or more packets each having a given time stamp, data files of the stream data and the real-time video object data to be managed by said file system information are stored under a single directory, when cells arranged in a reproduction order of the stream data are defined, the management information for managing the stream data includes start time information of the cell and end time information of the cell, and the start time information and the end time information are described using an arrival time of the packet, said method comprising:

providing the stream data;

recording the provided stream data on the data area;

providing the management information; and recording the provided management information on the management area.

3. A method of reproducing information from an information storage medium, said medium including, a data area configured to store stream data as well as real-time video object data which is different from the stream data;

a file information area configured to store file system information for managing files of the stream data and the real-time video object data; and a management area configured to store management information for managing the stream data being formed of one or more stream objects, wherein each stream object includes one or more packets each having a given time stamp, data files of the stream data and the real-time video object data to be managed by said file system information are stored under a single directory, when cells arranged in a reproduction order of the stream data are defined, the management information for managing the stream data includes start time information of the cell and end time information of the cell, and the start time information and the end time information are described using an arrival time of the packet, said method comprising:

reproducing the management information from the management area; and reproducing the stream data based on the reproduced management information.

4. An apparatus for recording information on an information storage medium, said medium including, a data area configured to store stream data as well as real-time video object data which is different from the stream data;

a file information area configured to store file system information for managing files of the stream data and the real-time video object data; and a management area configured to store management information for managing the stream data being formed of one or more stream objects, wherein each stream object includes one or more packets each having a given time stamp, data files of the stream data and the real-time video object data to be managed by said file system information are stored under a single directory, when cells arranged in a reproduction order of the stream data are defined, the management information for managing the stream data includes start time information of the cell and end time information of the cell, and the start time information and the end time information are described using an arrival time of the packet, said apparatus comprising:

a first recorder configured to record the stream data on the data area; and a second recorder configured to record the management information on the management area.

5. An apparatus for reproducing information from an information storage medium, said medium including, a data area configured to store stream data as well as real-time video object data which is different from the stream data;

a file information area configured to store file system information for managing files of the stream data and the real-time video object data; and a management area configured to store management information for managing the stream data being formed of one or more stream objects, wherein each stream object includes one or more packets each having a given time stamp, data files of the stream data and the real-time video object data to be managed by said file system information are stored under a single directory, when cells arranged in a reproduction order of the stream data are defined, the management information for managing the stream data includes start time information of the cell and end time information of the cell, and the start time information and the end time information are described using an arrival time of the packet, said apparatus comprising:

a first reproducer configured to reproduce the management information from the management area; and a second reproducer configured to reproduce the stream data based on the management information reproduced by the first reproducer.

6. A machine readable information storage medium for access by a recording or reproducing apparatus, said medium comprising:

a data area configured to store stream data;

a file information area configured to store file system information for managing files of the stream data; and a management area configured to store management information for managing the stream data being formed of one or more stream objects, wherein each stream object includes one or more packets each having a given time stamp, data files of the stream data to be managed by said file system information are stored under a single directory, when cells arranged in a reproduction order of the stream data are defined, the management information for managing the stream data includes start time information of the cell and end time information of the cell, and the start time information and the end time information are described using an arrival time of the packet.

* * * * *